US011860345B2

(12) United States Patent
Oskotsky et al.

(10) Patent No.: US 11,860,345 B2
(45) Date of Patent: Jan. 2, 2024

(54) MIDWAVE INFRARED DISCRETE ZOOM LENS

(71) Applicant: BAE SYSTEMS Information and Electronic Systems Integration Inc., Nashua, NH (US)

(72) Inventors: Mark Oskotsky, Mamaroneck, NY (US); Daniel Engheben, Commack, NY (US); Vincent Lipari, Whitestone, NY (US); Michael Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 289 days.

(21) Appl. No.: 17/238,813

(22) Filed: Apr. 23, 2021

(65) Prior Publication Data

US 2022/0342189 A1    Oct. 27, 2022

(51) Int. Cl.
*G02B 15/02*  (2006.01)
*G02B 26/08*  (2006.01)
*G02B 26/10*  (2006.01)

(52) U.S. Cl.
CPC ......... *G02B 15/02* (2013.01); *G02B 26/0816* (2013.01); *G02B 26/10* (2013.01)

(58) Field of Classification Search
CPC ............................................. G02B 15/02–12
See application file for complete search history.

(56) References Cited

U.S. PATENT DOCUMENTS

| 6,091,551 A | 7/2000 | Watanabe |
| 7,092,150 B1 | 8/2006 | Cox |
| 7,843,646 B2 | 11/2010 | Yang |
| 7,859,747 B2 | 12/2010 | Hiraiwa et al. |

(Continued)

FOREIGN PATENT DOCUMENTS

| CN | 102269871 B | * | 8/2013 |
| CN | 108345093 A | * | 7/2018 |

(Continued)

OTHER PUBLICATIONS

Muhammad Nadeem Akram, Muhammad Hammad Asghar, "Step-zoom dualfield-of-view IR telescope," Proc. SPIE 4832, International Optical Design Conference 2002, (Dec. 23, 2002).

(Continued)

*Primary Examiner* — Christopher Stanford
(74) *Attorney, Agent, or Firm* — KPIP Law, PLLC; Gary McFaline; Scott J. Asmus

(57) ABSTRACT

A mid-wave infrared (MWIR) discrete zoom lens for use with remote surveillance and identification having a dual focal length of 9 and 6.39 inches and F #2.8 and F #2, respectively. In one case, a full field of view is about 30.8 degrees for a 9 inch focal length configuration and about 43 degrees for a 6.39 inch focal length configuration. The lens is corrected for monochromatic and chromatic aberrations over the wavelength range 5100 nm-3300 nm. The focal plane may constitute a pixel array consisting of MWIR sensitive material (e.g. InSb, HgCdTe, nBn, SLS, etc.) for use in high-resolution, wide-area imaging applications.

20 Claims, 15 Drawing Sheets

(4 of 15 Drawing Sheet(s) Filed in Color)

(56) References Cited

U.S. PATENT DOCUMENTS

| | | | |
|---|---|---|---|
| 7,961,382 B2* | 6/2011 | Cornell | G02B 15/1441 359/356 |
| 8,724,216 B2 | 5/2014 | Vizgaitis | |
| 2018/0045926 A1 | 2/2018 | Rowlette | |
| 2020/0182066 A1 | 6/2020 | Theertham | |

FOREIGN PATENT DOCUMENTS

| | | | | |
|---|---|---|---|---|
| CN | 109343206 A | * | 2/2019 | G01J 5/00 |
| CN | 112180571 A | * | 1/2021 | G02B 13/18 |
| KR | 20160036285 A | * | 4/2016 | |

OTHER PUBLICATIONS

Mark L. Oskotsky, Lev Sakin, "Zoom systems: basic configurations," Proc. SPIE 3129, Zoom Lenses II, Sep. 25, 1997.

Mark L. Oskotsky, "Grapho-analytical method for the first order design of two-component zoom systems," Optical Engineering vol. 31, issue 5, 1992.

Daniel J. Reiley, "Folded Zoom Lenses—a review of patent literature," Caltech Optical Observatories, California Institute of Technology, Pasadena, CA 91125 SPIE-OSA, vol. 9293 92931O-7, 2014.

Anthony J. Yee, Yang Zhao, Samuel J. Steven, Rebecca Berman, Eryn A. Fennig, Dmitry Petropavlovskiy, Julie Bentley, Duncan T. Moore, Craig Olson, "The first order solutions for two configurations of discrete zoom lenses," Proceedings vol. 9822, Advanced Optics for Defense Applications: UV through LWIR; 982215 (2016).

* cited by examiner

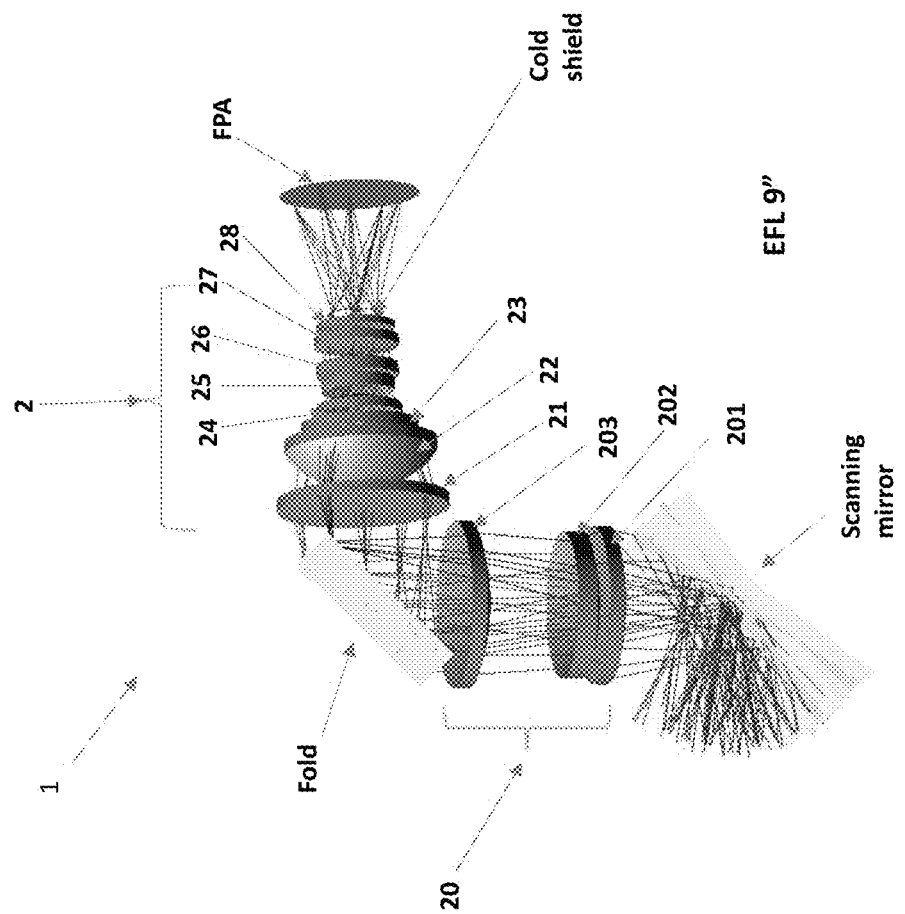

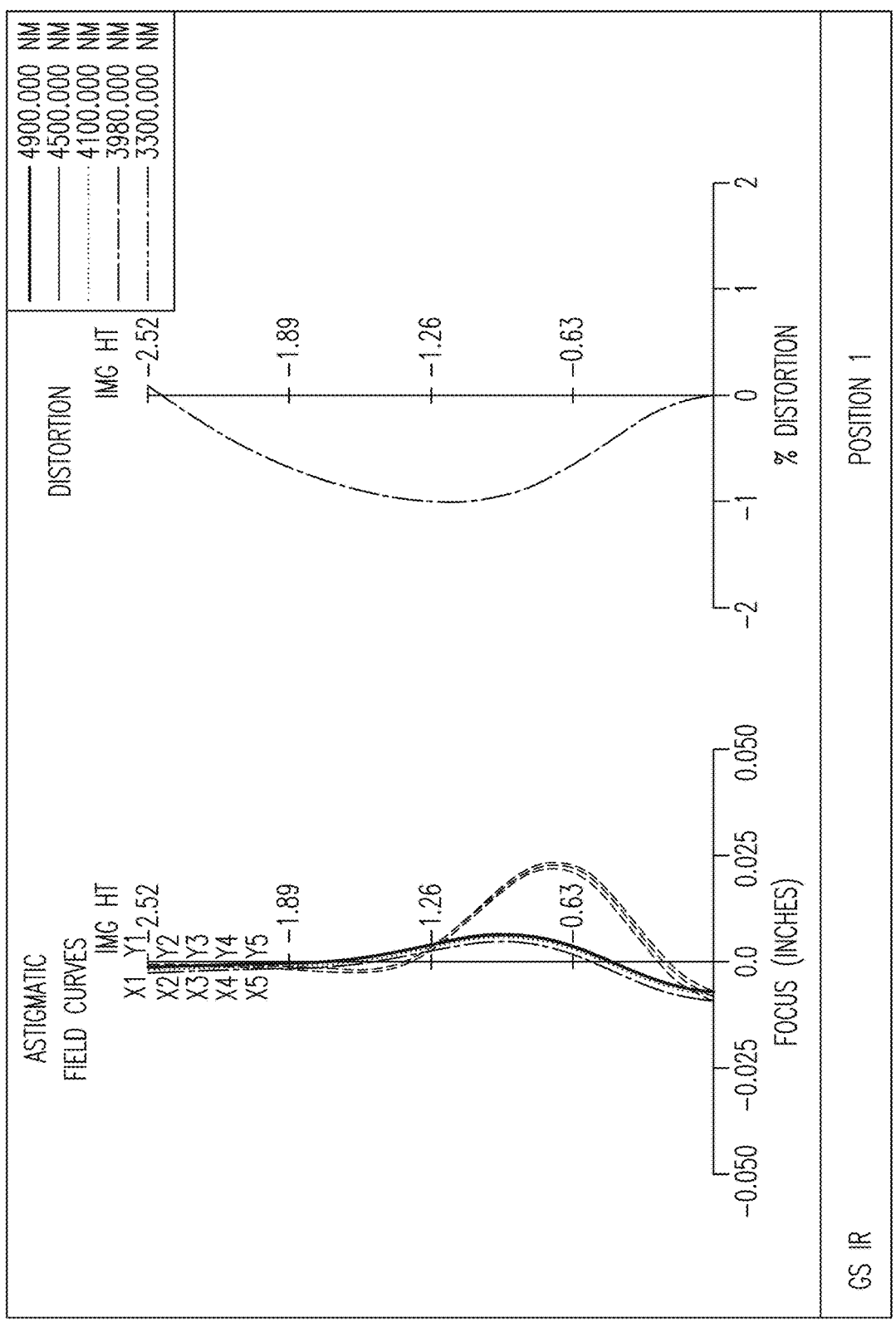

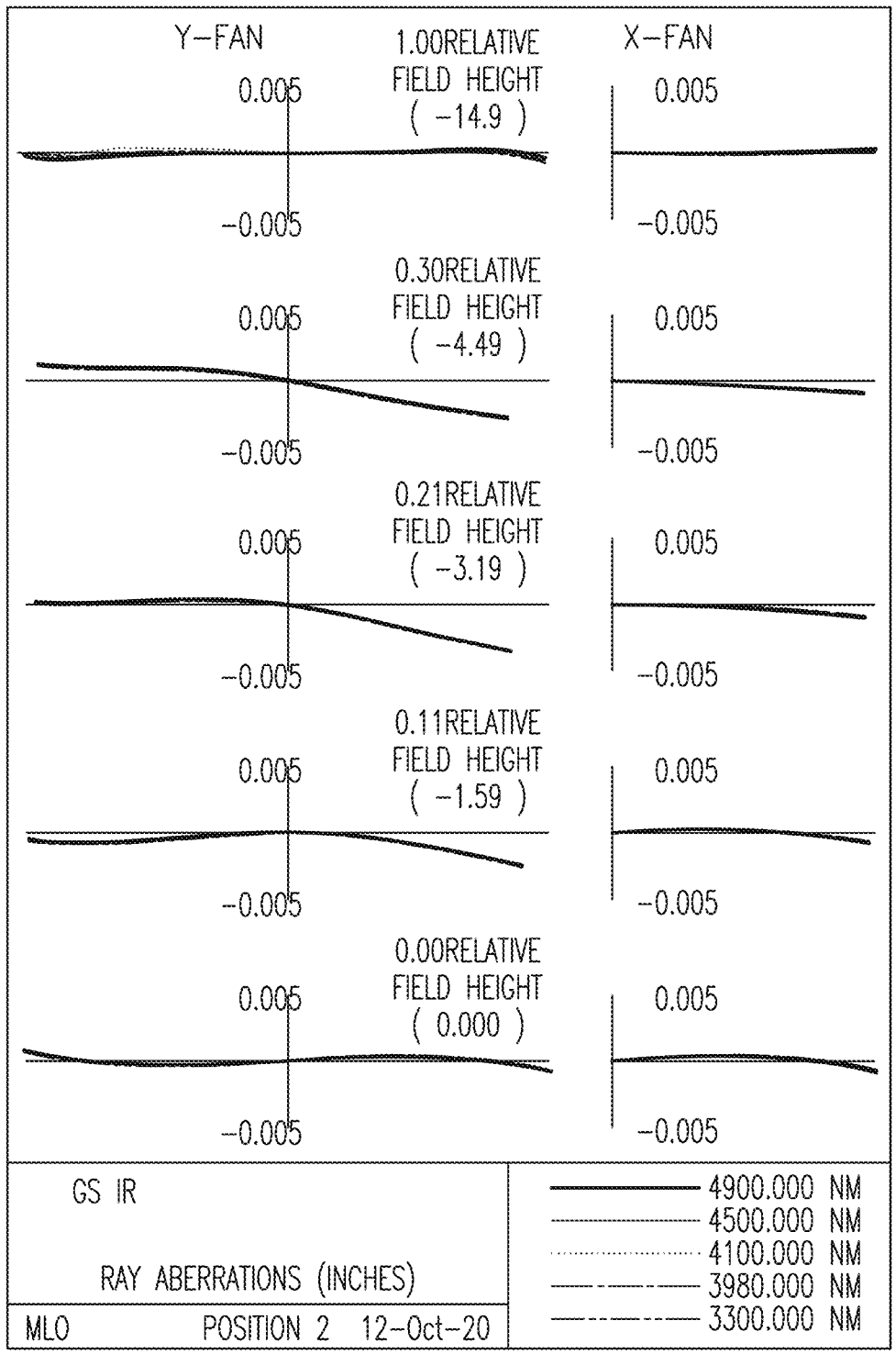

The form of asphere surfaces is as follows:

$$x = \frac{Cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Where:

- $z$     is the sag of the surface parallel to the z-axis
- $c$     is the curvature at the pole of the surface (CUY)
- $k$     is the conic constant (K) and

- $k=0$ — sphere
  - $-1 < k < 0$ — ellipsoid with major axis on the optical axis (prolate spheroid)
  - $k=-1$ — paraboloid
  - $k<-1$ — hyperboloid Also, $k=-e^2$, where $e$ is eccentricity For $k>0$ — oblate spheroid (not a conic section) the surface is generated by rotating an ellipse about its minor axis and $$k = e^2/(1-e^2)$$

where $e$ is the eccentricity of the generating ellipse

- $A, B, C, D, E, F, G, H, J$     are the 4th, 6th, 8th, 10th, 12th, 14th, 16th, 18th, 20th order deformation coefficients, respectively ($A = B = C = D = E = F = G = H = J = 0$ yields a pure conic surface)

- $r$     is the radial distance $= \sqrt{x^2+y^2}$

FIG. 7

MIDWAVE INFRARED DISCRETE ZOOM LENS

STATEMENT OF GOVERNMENT INTEREST

This disclosure was made with United States Government support under Contract No. S18CNE277, awarded by the U.S. Air Force, under Prime Contract Nos.: FA8620-16-G-3013 and FA8620-18-F-4062. The United States Government has certain rights in this invention.

FIELD OF THE DISCLOSURE

The present disclosure relates to midwave infrared (MWIR) lens systems and more particularly to discrete MWIR zoom lens systems used in mid-wave (3.3-5.1 µm) airborne sensors for intelligence, sighting, and tracking systems, especially in situations where there are extreme climatic and terrain conditions.

BACKGROUND OF THE DISCLOSURE

Midwave infrared (MWIR) lenses are used in high-performance cooled mid-wave (3.3-5.1 µm) IR imagers. These imagers/IR sensors perform remote surveillance and identification in combat intelligence, sighting, and tracking systems. These IR sensors can also be utilized in urban, rural, and remote situations. MWIR optics must be well-suited for fixed or portable payloads with a substantially low total life-cycle cost. MWIR lenses used on airborne platforms define such critical parameters like remote sensing resolution, field of view, and performance. Lenses also should provide 100% cold shield efficiency to maximize the energy flux collected. A challenge in designing such lenses for remote sensing is a requirement for achieving overall system performance with maximal resolving power while maintaining large field of view.

MWIR lenses are deployed on airborne platforms for remote surveillance and identification. To have advanced capabilities of target identification, changeable/adjustable resolution and changeable field of view are required. At the same time, imaging must be corrected over the wavelength range 5100 nm-3300 nm.

Conventionally, systems contain folded zoom lenses configurations, and step zoom dual field of view IR telescope configurations. In some cases, interchangeable lenses are mounted on a camera and swapped out for other lenses. Unlike fixed lenses, which are built into (mostly compact) cameras, interchangeable lenses provide the user with a wider choice of image-capture capabilities. In some cases, these lenses consist of two groups of optical elements that work in the visible range of the spectrum, not IR, and are not discretely zoomable.

One example of an existing infrared zoom lens uses two band widths: MWIR range 3-5 microns and LWIR range 8-12 microns. That system consists of five optical groups, and operates in tree modes: wide angle, intermediate and telephoto. It utilizes silicon and germanium and has F #1-1.4 and an effective focal length (EFL) range of 25 mm-100 mm or 50 mm-200 mm. Another example of an existing infrared zoom lens is small-sized and low-cost and consists of three optical groups. It utilizes ZnS as its power elements material. In that disclosure a second lens group is moved such that the first and third lens groups are fixed, so focal plane position is not stable, and performance is not consistent over zoom range. The system works only in LWIR range (8-12 microns bandwidth) with a zoom range of 1.7×. Yet another example of an existing MWIR lens consists of two groups of elements, including elements with aplanatic shape. This microscope type lens images objects onto a FPA (Focal Plane Array), and the lens does not provide changeable focal length.

Another catadioptric infrared lens was designed to work in MWIR and LWIR spectral ranges. There, the lens consists of a reflective part TMA (Three Mirror Anastigmat) and a refractive part and may be used for remote sensing/surveillance purposes. The lens implements two moveable components to achieve continuous zoom range of 3.42×. An afocal component may be added to extend the zoom range. That system used a plurality of infrared materials such as Germanium, Barium Fluoride and Zinc Selenide, and the lens operates at F #3.

Yet another existing infrared zoom lens is an optically compensated infrared zoom lens having a single movable lens carriage and no aspheric lenses. That lens system consists of six optical groups, where the second and fourth groups are axially moved together, and all other groups are stationary. The lens operates in two bandwidths MWIR 2.5-5.5 microns and LWIR 8-14 microns. The image position is not stable over the entire 4× zoom range and the position of the zooming subassembly is specified by fourth order equation.

In yet another system, a switchable lens is connected to a photo-camera zoom lens and is flipped to change the magnification. At that magnification, a first position of the lens is inverse to the magnification at a second position of the lens. Zoom lens focal lengths are changed while flipping the magnification lens and are proportional to the magnification of the switchable lens, while zoom range stays the same.

Wherefore it is an object of the present disclosure to overcome the above-mentioned shortcomings and drawbacks associated with conventional MWIR zoom lenses systems.

SUMMARY OF THE DISCLOSURE

One aspect of the present disclosure is a discrete zoom lens, comprising in order from a remote object to an image plane: a scanning mirror; a first changeable group having a positive optical power; a second changeable group having a positive optical power; a fold mirror a second group having a positive optical power; an aperture stop; and a focal plane array; wherein a ratio between focal lengths having the first changeable group and the second changeable group is 1.41×, a magnification of the second group is about 1×, and the discrete zoom lens is corrected over a spectral waveband of 5.1 µm to 3.3 µm.

One embodiment of the discrete zoom lens is wherein the first changeable group is configured to receive light from the remote object and to direct converged light onto the second group, the first changeable group comprising three optical elements having in order from the remote object to the image plane positive, negative, and positive optical powers.

Another embodiment of the discrete zoom lens is wherein the second changeable group is configured to receive light from the remote object and to direct converged light onto the second group, the second changeable group comprising three optical elements having in order from the remote object to the image plane positive, negative, and positive optical powers.

Certain embodiments of the discrete zoom lens are wherein both the first changeable group and the second changeable group create an intermediate image before the second group and the fold mirror is configured to bend an optical axis between the first changeable group or second changeable group and the second group. In some embodiments, the second group comprises eight elements having in order from the remote object to the image plane positive, positive, negative, positive, negative, positive, positive, positive optical powers.

Yet another embodiment of the discrete zoom lens is wherein a cold shield is the aperture stop and is positioned between the second group and the focal plane array, a distance from the cold shield to the focal plane array is 4.37 inches.

Still yet another embodiment of the discrete zoom lens is wherein for a discrete zoom lens configuration 1 that includes the first changeable group and the second group, a lens focal length of 6.39 inches, and $0.85 < f_{L1}/F_{CG1} < 1.15$ $0.90 < F_{L1}/F_{G2} < 1.20$ $3.55 < OAL/F_{L1} < 3.95$ $0.90 < F_{CG1}/F_{11} < 1.10$ $-1.45 < F_{CG2}/F_{12} < -1.20$ $1.20 < F_{CG1}/F_{13} < 1.45$ $0.65 < F_{G2}/F_{21} < 0.85$ $1.40 < F_{G2}/F_{22} < 1.70$ $-2.35 < F_{G2}/F_{23} < -2.15$ $1.10 < F_{G2}/F_{24} < 1.30$ $-3.15 < F_{G2}/F_{25} < -2.95$ $2.30 < F_{G2}/F_{26} < 2.55$ $0.10 < F_{G2}/F_{27} < 0.30$ $1.35 < F_{G2}/F_{28} < 1.70$ $1.35 < F_{L1}//CSD < 1.55$ $2.50 < V_{11}/V_{12} < 2.70$ $0.90 < V_{11}/V_{13} < 1.20$ $0.90 < V_{21}/V_{22} < 1.20$ $2.50 < V_{21}/V_{23} < 2.70$ $2.50 < V_{21}/V_{24} < 2.70$ $2.50 < V_{21}/V_{25} < 2.70$ $0.90 < V_{21}/V_{26} < 1.20$ $0.90 < V_{21}/V_{27} < 1.20$ $0.90 < V_{21}/V_{28} < 1.20$ wherein for a discrete zoom lens configuration 2 that includes the second changeable group and the second group, a lens focal length of 9 inches, and $0.90 < F_{L2}/F_{CG2} < 1.10$ $1.45 < F_{L2}/F_{G2} < 1.65$ $2.50 < OAL/F_{L1} < 2.70$ $1.55 < F_{CG2}/F_{201} < 1.65$ $-1.15 < F_{CG2}/F_{202} < -0.85$ $1.40 < F_{CG2}/F_{203} < 1.65$ $1.90 < F_{L1}/CSD < 2.15$ $2.50 < V_{201}/V_{202} < 2.70$ $0.90 < V_{21}/V_{203} < 1.20$, wherein:

$F_{L1}$ is the focal length of the lens according to the first configuration, $F_{L2}$ is the focal length of the lens according to the second configuration, $F_{CG1}$ is the focal length of the first changeable group according to the first configuration, $F_{CG2}$ is the focal length of the second changeable group according to the second configuration, $F_{G2}$ is the focal length of the second group, common for both configurations, OAL is the overall length of the lens, CSD is the cold shield distance from the aperture stop to the focal plane array, $F_{11}$, $F_{12}$, $F_{13}$ are focal length of the first, second and third elements of the first changeable group, $F_{201}$, $F_{201}$, $F_{203}$ are the focal lengths of the first, second and third optical elements of the second changeable group, $F_{21}$, $F_{22}$, $F_{23}$, $F_{24}$, $F_{25}$, $F_{26}$, $F_{27}$, $F_{28}$ are the focal lengths of the first, second, third, fourth, fifth, sixth, seventh and eighth optical elements of the second common group, $V_{11}$, $V_{12}$, $V_{13}$ are the Abbe numbers of the first, second and third optical elements of the first changeable group, $V_{201}$, $V_{202}$, $V_{203}$ are the Abbe numbers of the first, second and third optical elements of the second changeable group, and $V_{21}$, $V_{22}$, $V_{23}$, $V_{24}$, $V_{25}$, $V_{26}$, $V_{27}$, $V_{28}$ are the Abbe numbers of the first, second, third, fourth, fifth, sixth, seventh and eighth optical elements of the second common group.

Another aspect of the present disclosure is a discrete zoom lens, comprising in order from a remote object to an image plane: a scanning mirror; a first changeable group having a positive optical power, wherein the first changeable group is configured to receive light from the remote object and to direct converged light onto the second group, the first changeable group comprising three optical elements having in order from the remote object to the image plane positive, negative, and positive optical powers; a second changeable group having a positive optical power, wherein the second changeable group is configured to receive light from the remote object and to direct converged light onto the second group, the second changeable group comprising three optical elements having in order from the remote object to the image plane positive, negative, and positive optical powers; a fold mirror; a second group having a positive optical power, wherein the second group comprises eight elements having in order from the remote object to the image plane positive, positive, negative, positive, negative, positive, positive, positive optical powers; an aperture stop; and a focal plane array; wherein a ratio between focal lengths having the first changeable group and the second changeable group is 1.41×, a magnification of the second group is about 1×, and the discrete zoom lens is corrected over a spectral waveband of 5.1 µm to 3.3 µm.

One embodiment of the discrete zoom lens is wherein both the first changeable group and the second changeable group create an intermediate image before the second group and the fold mirror is configured to bend an optical axis between the first changeable group or second changeable group and the second group.

Another embodiment of the discrete zoom lens is wherein the first element of the first changeable group has positive optical power and is made in a form of a positive meniscus lens whose concave surface faces toward the object, and a first surface of the first optical element is formed aspherical.

In certain embodiments, the second element of the first changeable group has a negative optical power and is made in a form of a negative meniscus lens whose concave surface faces toward the object, and a second surface of the second element of the first changeable group is formed aspherical.

In some embodiments, the third element of the first changeable group has a positive optical power and is made in a form of a positive meniscus whose concave surface faces toward the object, and the second surface of the third element of the first changeable group is formed aspherical.

Yet another embodiment of the discrete zoom lens is wherein the first element of the second changeable group has a positive optical power and is made in a form of a positive meniscus lens whose concave surface faces toward the image, and a first surface of the first optical element of the second changeable group is formed aspherical.

In certain embodiments, the second element of the second changeable group has a negative optical power and is made in a form of a negative meniscus lens whose concave surface faces toward the image, and a second surface of the second optical element of the second changeable group is formed aspherical.

In some embodiments, the third element of the second changeable group has a positive optical power and is made in a form of positive meniscus lens whose concave surface faces toward the image, and a second surface of the third optical element of the second changeable group is formed aspherical.

Still yet another embodiment of the discrete zoom lens is wherein a total length of the discrete zoom lens along an optical axis does not exceed 25 inches.

Yet another aspect of the present disclosure is a discrete zoom lens, comprising in order from a remote object to an image plane: a scanning mirror; a first changeable group having a positive optical power; a second changeable group having a positive optical power; a fold mirror; a second group having a positive optical power, comprising: a first element having a positive optical power and made in a form of a double convex lens; a second element having a positive optical power and made in a form of a positive meniscus lens whose concave surface faces toward the image; a third element having a negative optical power and made in a form of negative meniscus lens whose concave surface faces toward the image; a fourth element having a positive optical power and made in a form of a positive meniscus lens whose concave surface faces toward the remote object; a fifth element having a negative optical power and made in a form of negative meniscus lens whose concave surface faces toward the remote object; a sixth element having a positive optical power and made in a form of a positive meniscus lens whose concave surface faces toward the remote object; a seventh element having a positive optical power and made in a form of a positive meniscus lens whose concave surface faces toward the image; and an eighth element having a positive optical power and made in a form of a positive meniscus lens whose concave surface faces toward the remote object; an aperture stop; and a focal plane array; wherein a ratio between focal lengths having the first changeable group and the second changeable group is 1.41×, a magnification of the second group is about 1×, and the discrete zoom lens is corrected over a spectral waveband of 5.1 µm to 3.3 µm.

One embodiment of the discrete zoom lens is wherein a total length of the discrete zoom lens along an optical axis does not exceed 25 inches. Another embodiment of the discrete zoom lens is wherein the elements are made of silicon or germanium. Yet another embodiment of the discrete zoom lens is wherein a cold shield is the aperture stop and is positioned between the second group and the focal plane array, a distance from the cold shield to the focal plane array is 4.37 inches.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1C and FIG. 1D show one embodiment of the discrete zoom lens according to the principles of the present disclosure.

FIG. 4A and FIG. 4B show astigmatism and distortion data for one embodiment of the discrete zoom lens according to the principles of the present disclosure.

FIG. 6A and FIG. 6B shows RIM RAY curves for one embodiment of the discrete zoom lens according to the principles of the present disclosure.

FIG. 7 shows an equation for asphere calculation used for one embodiment of the discrete zoom lens according to the principles of the present disclosure.

DETAILED DESCRIPTION OF THE DISCLOSURE

Figure 1A:
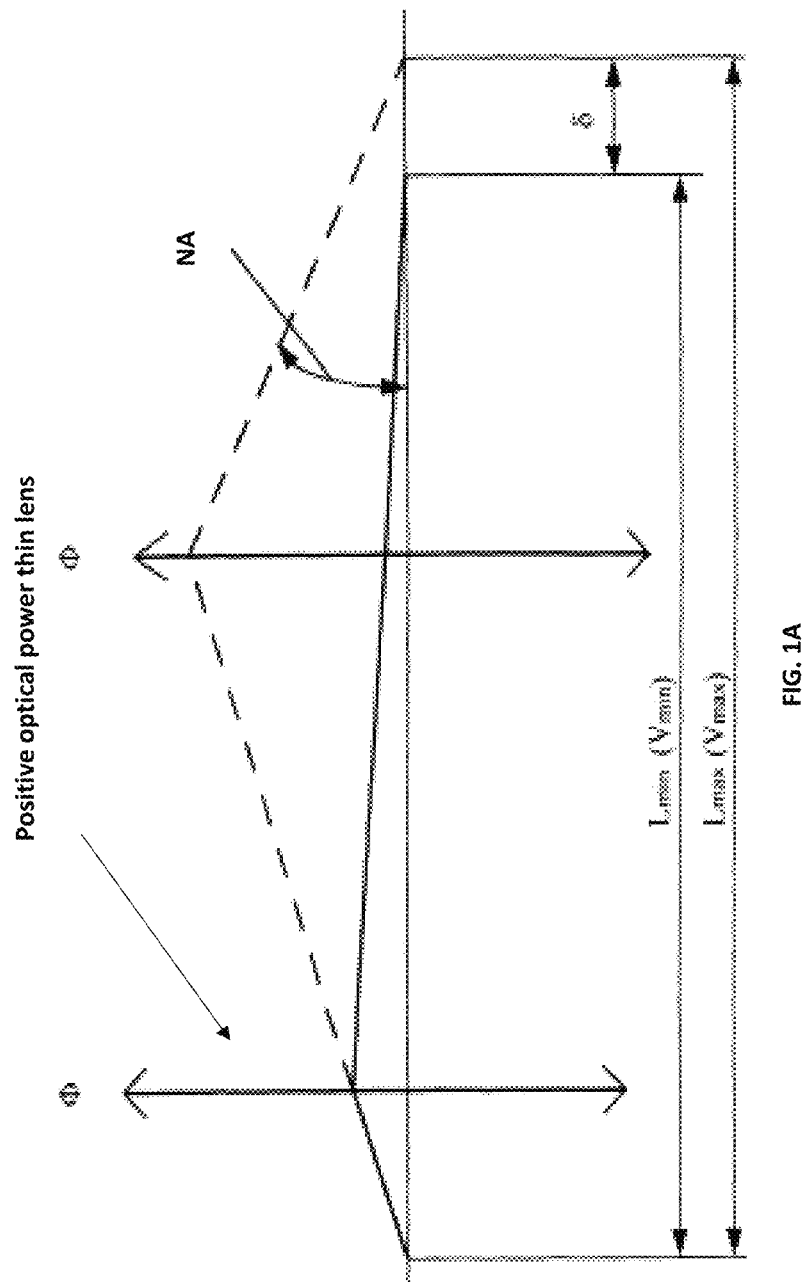
FIG. 1A shows an optical two-point compensation for a single lens where a lens is moved along the optical axis.

One embodiment of the present disclosure is a mid-wave infrared (MWIR) discrete zoom lens for use with remote surveillance and identification having a dual focal length of 9 and 6.39 inches and F #2.8 and F #2, respectively. In one embodiment, a full field of view is about 30.8 degrees for a 9-inch focal length configuration and about 43 degrees for a 6.39-inch focal length configuration. The lens is corrected for monochromatic and chromatic aberrations over the wavelength range 5100 nm-3300 nm. The focal plane may comprise a pixel array consisting of MWIR sensitive material (e.g., InSb, HgCdTe, nBn, SLS, etc.) for use in high-resolution, wide-area imaging applications.

In one embodiment the lens comprises, in order from the object to the image, two (i.e., front and rear) groups of optical elements. In certain cases, a cold shield/aperture stop is located at a distance of 4.37 inches from the image plane. In this embodiment, the front optical group has a positive optical power and includes three optical elements, and the rear optical group has a positive optical power and includes eight optical elements. The front optical group is interchangeable in order to create discrete zoom of 1.41×. In some cases, the discrete zoom lens includes two types of optical materials. The powers of the optical groups and elements, their shapes, refractive indices, and dispersions of materials are selected such that the lens is apochromatic and orthoscopic. In certain embodiments, the lens is used in a scanning mode with a scan mirror located in front of the lens.

A specification for one embodiment of the lens of the present disclosure is shown in Table 1:

TABLE 1

| Wavelengths | 3.3-5.1 μm |
|---|---|
| EFL | 6.39"-9" |
| F/# | 2 EFL 6.39" |
| | 2.8 EFL 9" |
| Detector | 3.87" × 3.87" (5.47" diagonal) |
| | 12288 × 12228 pixels (8 μm pitch) |
| IFOV | 49 μrad EFL 6.39" |
| | 35 μrad EFL 9" |
| Distortion | <1.5% |
| FFOV | 46.34° EFL 6.39" |
| | 33.8° EFL 9" |
| Discrete zoom range | 1.41X |
| Measured | 31.25 lp/mm |
| MTF Frequency | (½-Nyquist) |
| Min. MTF across FOV | 0.30 EFL 6.39" |
| # ½-Nyquist | 0.25 EFL 9" |
| # of Elements | 11 |
| # of Aspheres | 11 surfaces |
| Element Materials | Ge & Si |

Image size and resolution of the lenses are determined by the focal length, field of view and the F #. The angle of view specifies how much of the scene will be captured—and the focal length and F #—size of the image, resolution and energy flux. The longer the focal length, the narrower the angle of view assuming that image size is the same. The F # may be the same or it may change for different focal lengths and fields of view depending on the resolution required for a particular application. In general, the focal length of a lens and detector size define the lens's angular field of view. For a given detector size, the shorter the focal length, the wider the angular field of the lens.

For advanced applications, for example for the reconnaissance and identification purposes, the field of view and the focal length have to be zoomed/changed in order to cover the different size of the observed area with different magnification while using the same detector. At that image plane, the detector should not change its position along the optical axis. To compensate for image plane shift, a special compensation technique is necessary. At the same time, performance of the optical system should consistently meet the resolution requirements for the particular application.

It is understood that there are different types of zoom systems. The first is mechanically compensated zoom systems, where at least two optical components are moved along the optical axis. One is moved by the linear law to change the focal length and the other is moved by the non-linear law in order to keep the image at the same position. The second is optically compensated zoom systems, where only one component moves, or the two or more components are moved together.

There are only two positions along the optical axis in the case of one moveable component when pupils and image planes are correspondingly conjugated at different zoom positions. In this case, magnification of the moveable component for two zoom positions is inverse, for example 5× and ⅕×. At the same time, the optical system must be corrected for monochromatic and chromatic aberrations for both zoom positions.

There are three positions (and three magnifications or focal lengths) for an optical compensation with two components moving together when keeping an image plane at the same position. In general, the number of discrete points along the optical axis that keep the image plane stable is equal to 1+number of moveable components.

Conventional solutions include switchable lenses, for example in photo cameras, where objectives are simply switched, or a special attachment may be used to change the focal length. Also, there are discrete zoom systems with a changeable group of lenses that accomplishes two field-of-views (FOV). This contrasts with a continuous zoom system where the magnification of the lens is smoothly varied between extremes without interruption to the image by a combination of moving lens groups.

Optical two-point compensation, or compensation for a small range of focal lengths for a single lens, can be achieved by moving the whole lens. A system with a thin lens moved along the optical axis is presented in FIG. 1A. Referring to FIG. 1A, for paraxial optics for a thin lens with front and back principal planes coinciding and positive optical power $\Phi$: $L=F(2V+V^2+1)/V$ where L is distance between the object and image planes and is dependent on the moveable component magnification modulus V. F is Focal length of the moveable lens, $F=1/\Phi$. For a lens with minimal magnification modulus of 1, defocus or shift of the image plane $\delta$ is: $\delta=L_{max}-L_{min}=F(V_{max}^2-2V_{max}+1)/V_{max}$. For example, for $V_{max}=1.1$ and $V_{min}=1$: $\delta=0.009F$. In the case when $V_{max}=1/V_{min}$, $\delta$ is equal to 0, so the focal plane does not move and is stable. The connection between the wave front aberration W and defocus $\delta$ is described by: $W=\frac{1}{2}\int_0^{NA} \delta d(NA^2) = \frac{1}{2}\delta(NA^2)$ where NA is numerical aperture at the image plane. It is convenient to estimate tolerable NA and magnification ranges for the minimum system length. The chromatic and monochromatic aberrations must be corrected for the two positions of the lens.

Similar considerations are applied to a two component or two optical group system with one changeable or moveable component or group. The ability to use interchangeable groups gives more freedom to the optical designers because its focal length may be changed independently from the distance between the groups. For the first order calculations the optical power $\Phi$ of the two component/group system is: $\Phi=\Phi_1+\Phi_2-\Phi_1\Phi_2 d$ where $\Phi_1$ and $\Phi_2$ are the optical powers of the first group and second group correspondingly and d is the distance between the principal planes of this groups. In this case, optical powers $\Phi_I$ and $\Phi_{II}$ for the whole lens at the two different positions di and of the first group with respect to the second group are expressed by:

$$\Phi_I = \Phi_{11} + \Phi_2 - \Phi_1\Phi_2 d_I \text{ for the first configuration with one first group} \quad (1)$$

$$\Phi_{II} = \Phi_{12} + \Phi_2 - \Phi_1\Phi_2 d_{II} \text{ for the second configuration with another first group} \quad (2)$$

In equations (1) and (2):

$\Phi_{11}$ is first changeable front group optical power at the first configuration.

$\Phi_{12}$ is second changeable front group optical power at the second configuration.

or:

$$EFL_I = (EFL_{11}EFL_2)/(EFL_2 + EFL_{11} - d_I) \quad (3)$$

$$EFL_{II} = (EFL_{12}EFL_2)/(EFL_2 + EFL_{12} - d_{II}) \quad (4)$$

where:

$EFL_I$ is the total focal length at the first configuration.
$EFL_{II}$ is the total focal length at the second configuration.
$EFL_{11}$ is one changeable front optical group focal length at the first configuration.
$EFL_{12}$ is another changeable front optical group focal length at the second configuration.

At the same time, when working with infinitely remote object, total effective focal length depends on magnification $V_2$ of the rear (second) optical group:

$$EFL_I = EFL_{11} * V_2 \text{ for the first configuration} \quad (5)$$

$$EFL_{II} = EFL_{12} * V_2 \text{ for the second configuration} \quad (6)$$

where:

$V_2$=const.=magnification of the second non-changeable optical group. There is no ordinary answer on determination of the first order properties of the two-group system with one changeable group. Solution space is determined by equations (3), (4), (5) and (6).

The optimal solution should incorporate correction of optical aberrations for the whole optical system because aberrations will change when the first group is changed/replaced. The main aberrations to be corrected for good imaging are spherical aberration, coma, astigmatism and distortion. Petzval field curvature correction is more difficult because of the discrete zoom feature, where optical power of the first interchangeable group differs in order to obtain two different focal length. Also, chromatic aberrations such as axial color and lateral color must be corrected over the whole spectrum of 5100 nm-3300 nm.

A MWIR lens is a thermal-imaging system, and for maximum sensitivity it uses cryogenically cooled detectors which operate at the liquid nitrogen temperature of 77 K or lower. If a focal plane array (FPA) receives additional thermal energy, other than the energy contained within the scene being viewed, then the sensitivity is reduced. Typically, the FPA is mounted into a thermally insulated Dewar assembly. A cold stop is a thermal baffle mounted in front of the Dewar and is the hard aperture stop for the optical system.

The IR system must have 100% cold stop efficiency in order for the detector to receive the energy only from the scene of observation. With 100% cold stop efficiency, the detector records energy from both the cone of light representing scene energy and from the cryogenically cold thermal baffle, known as a cold stop. If every pixel on the FPA sees only the solid angle representing the energy from the scene, then the system is 100% cold stop efficient.

In a discrete zoom lens, the cold stop also represents the exit pupil and has to be conjugated with the entrance pupil for both configurations. That also requires correction of the spherical and coma pupil aberrations. Usually, a scanning mirror is incorporated in front of the optics in the entrance pupil space and when pupils are well conjugated the scanning mirror size is minimal. Because of the change of the front group all first order parameters and aberrations change. The effective method to balance the aberrations through the zoom is by using Seidel sums or aberration coefficients for spherical aberration, coma, astigmatism, field curvature and distortion. At the focal plane for zero defocus wavefront W is expressed by the following equation: $W(\rho,\theta) = s(\rho d)^4 + c\alpha(\rho d)^3 \cos\theta + a\alpha^2(\rho d)^2 \cos^2\theta + u\alpha^2(\rho d)^2 + g\alpha^3(\rho d)\cos\theta$, where s, c, a, u and g are aberration coefficients for spherical aberration, coma, astigmatism, field curvature and distortion, respectively, $\alpha$ is the field angle, $\rho d$ is the height in the pupil, with d being the nominal pupil radius and $\rho$ the relative (0 to 1) height in the pupil, and $\theta$ the pupil angle (absent in radially symmetrical aberrations, like spherical), determining pupil coordinate at which the image point originates. Since the sum of the powers in a and d terms is 4, they are also called 4th-order wavefront aberrations. For the corresponding transverse ray aberration form, the sum of these two powers is 3—so these are called 3rd-order transverse ray aberrations.

The first three primary aberrations—spherical, coma and astigmatism represent deviations of the wavefront form from a spherical shape. Their existence causes degradation of the point image quality. Another two aberrations—field curvature and distortion—represent aberration in the image space. Spherical and field curvature aberrations are symmetrical about the pupil center.

In terms of Seidel aberration calculation, the aberration function takes the form:

$$W(\rho,\theta) = (S'/8)\rho^4 + (C'/2)\rho^3 \cos\theta + (A'/2)\rho^2 \cos^2\theta + (U'/4)(A'+P)\rho^2 + (G'/2)\rho\cos\theta$$

with S', C', A', U' and G' being the Seidel sums for spherical aberration, coma, astigmatism, field curvature and distortion (usually denoted by $S_I$, $S_{II}$, $S_{III}$, $S_{III}+S_{IV}$ and $S_V$), P being the Petzval sum (denoted by $S_{IV}$), and h the point image height in the Gaussian image space normalized to the maximum object height $h_{max}=1$. Obviously, for the maximum height $h_{max}$, the function becomes $$W(\rho,\theta) = (S'/8)\rho^4 + (C'/2)\rho^3 \cos\theta + a(A'/2)\rho^2 \cos^2\theta + (U'/4)(A'+P)\rho^2 + (G'/2)\rho\cos\theta$$

Solving a system of Seidel sums for two configurations of a discrete zoom lens gives a balanced aberrational solution for the changeable first group and second group. The higher order aberrations are addressed by the shapes of the optical elements along with making some surfaces aspherical.

Chromatic aberration largely affects quality of the image of the high-resolution lenses used in aerial photography and mapping. The chromatic aberration is corrected by the proper choice of optical elements, optical powers, and materials. Properties of optical elements also vary with wavelength. Axial chromatic aberration is the longitudinal variation of focus (or image position) with wavelength. In general, the index of refraction of optical materials is higher for short wavelengths than for long wavelengths; this causes the short wavelengths to be more strongly refracted at each surface of a lens. Thus, in a simple positive lens, for example, the 3.3 μm wavelength rays are brought to a focus closer to the lens than the 5100 μm rays. The distance along the axis between the two focus points is the longitudinal axial chromatic aberration. The difference between the image heights for different colors is called lateral color.

There are different types of chromatic aberration correction. First, achromatic correction means that two wavelengths at the edge of the spectrum intersect on axis at the image plane and usually require two different materials to be used. Second, apochromatic correction means that the lens provides correction of chromatic aberrations for three selected wavelengths for the elimination of secondary spectrum and requires 2-3 materials. Third, super apochromatic correction means that the lens provides correction of chromatic aberrations for four selected wavelengths and requires 3-4 materials.

When the axial color is corrected, the remaining chromatic aberration is referred to as a secondary color. Secondary color is the difference between focus points for the outer wavelengths and the central wavelength. Monochromatic and chromatic aberrations depend on the heights and angles of rays at the optical elements, as well as on the shape of the optical element and its location with respect to the aperture stop.

Refractive index N of the optical materials depends on the wavelength $\lambda$ and usually is described by Sellmeier dispersion formula, which is given below in a simplified three terms form, used by optical glass manufacturers:

$$n^2-1=\{A_1\lambda^2/(\lambda^2-B_1)\}+\{A_2\lambda^2/(\lambda^2-B_2)\}+\{A_3\lambda^2/(\lambda^2-B_3)\}$$

where coefficients $A_1$, $A_2$, $A_3$, $B_1$, $B_2$ and $B_3$ are determined by a least square fit to the measured refractive index data. Optical dispersion is often quoted as a unit-less ratio called the reciprocal relative dispersion or Abbe number, defined by: $V=(n_{mean}-1)\Delta n=(n_{mean}-1)/(n_1-n_2)$ where $n_{mean}$ is mean center value, $n_1$ and $n_2$ are refractive indices for the outer wavelengths. The smaller the Abbe number the larger the dispersion.

Most Common optical materials/glasses used for MWIR applications include Germanium, Silicon, ZnSe, ZnS, Cleartran, AMTIR, Infrared Chalcogenide glasses, CdTe, CaF2. Germanium and silicon are preferred for the aberrational correction because of high indices and low angles of incidence on optical surfaces. The lesser the number of glasses used the better it is for the production but correction of the chromatic aberration, especially for the wide spectrum, which requires more glasses with a certain match of chromatic dispersions.

Figure 1B:
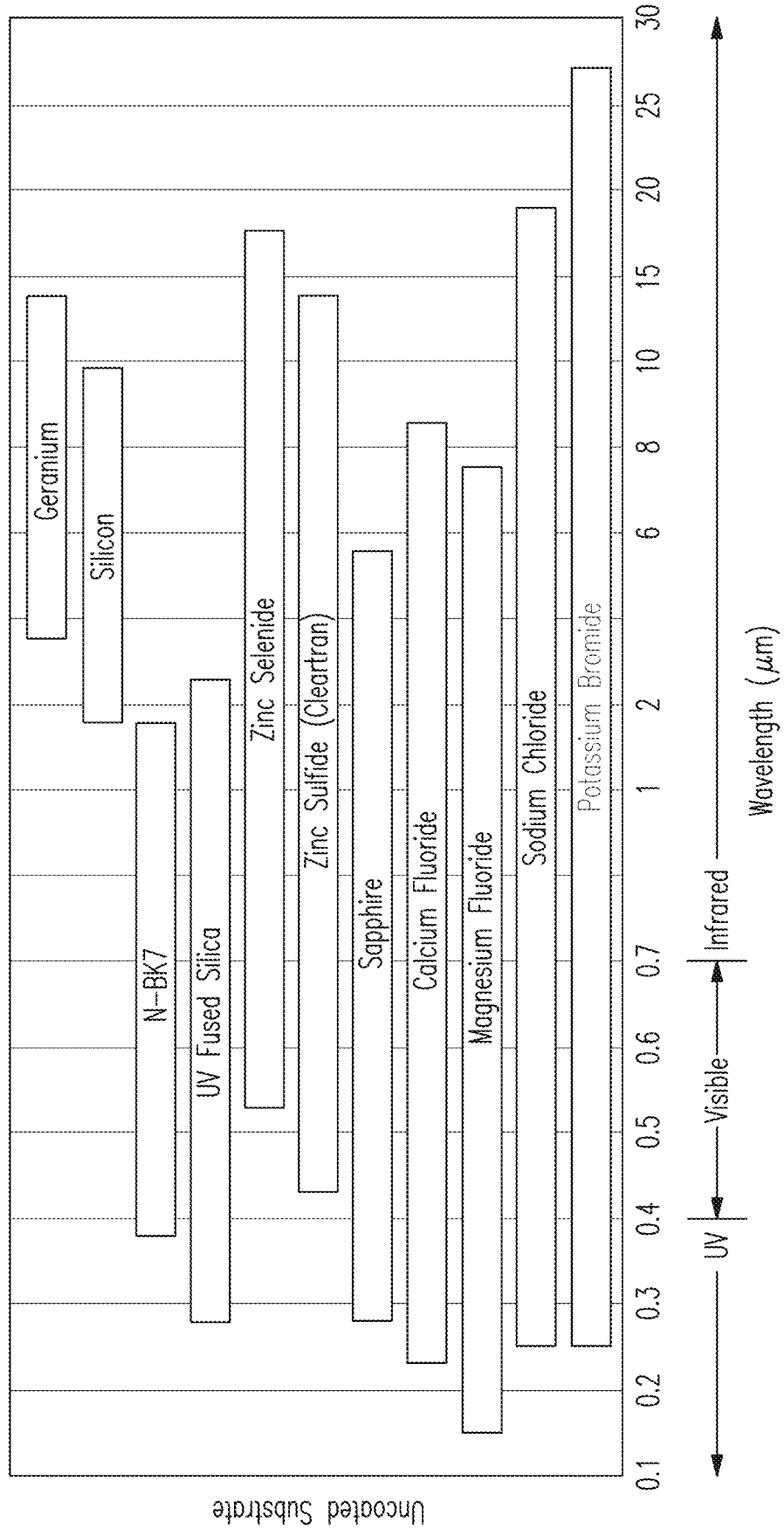
FIG. 1B shows a table of available SWIR (short waves infrared) and MWIR spectrum materials.

Referring to FIG. 1B, a table of available SWIR (short waves infrared) and MWIR spectrum materials are shown. More specifically, Germanium has a V-value of approximately 100 in the MWIR spectrum and elements from germanium act as flint glass and have negative optical powers. Silicon has a V-value is 250 and elements from silicon act as crown glass and have positive optical powers. The monochromatic and chromatic correction solution represents a balance of all elements optical powers and shapes, materials properties, such as refractive index and chromatic dispersion.

Refractive index is affected by changes in glass temperature. This can be ascertained through the temperature coefficient of refractive index. The temperature coefficient of refractive index is defined as $\Delta n/\Delta T$. There are two ways of showing the temperature coefficient of refractive index. One is the absolute coefficient ($\Delta n/\Delta T$ absolute) measured under vacuum and the other is the relative coefficient ($\Delta n/\Delta T$ relative) measured at ambient air (101.3 kPa {760 torr} dry air). The correlation between them is: $\Delta n/\Delta T_{absolute}=\Delta n/\Delta T_{relative}+n-(\Delta n_{air}/\Delta T)$.

For Germanium temperature depended modified Sellmeier equation fitting experimental data is: $n^2=A+B\lambda^2/(\lambda^2-C)+D\lambda^2/(\lambda^2-E)$, where:

$$A=-6.040\times10^{-3}T+11.05128$$

$$B=9.295\times10^{-3}T+4.00536$$

$$C=-5.392\times10^{-4}T+0.599034$$

$$D=4.151\times10^{-4}T+0.09145 \text{ and}$$

$$E=1.51408T+3426.5.$$

Calculations from this equation has been evaluated, from which accurate values for high-grade optical quality germanium are within 0.025% or better, over the 2.5-14 µm range. The dispersion equation/modification of Sellmeier formula, used by some glass manufacturers, is: $n^2=e+A/\lambda^2+B\lambda_1^2/(\lambda^2-\lambda_1^2)$, where: $\lambda_1=1.1071$ µm; $e=1.16858\times101$; $A=9.39816\times10^{-1}$ and $B=8.10461\times10^{-3}$.

TABLE 2

Common IR materials properties

| Material | Refr. Index 4 µm | Refr. Index 10 µm | dn/dt/C |
|---|---|---|---|
| Germanium | 4.0243 | 4.0032 | 0.000396 |
| Silicon | 3.4255 | 3.4179[*] | 0.000150 |
| Zinc sulfide, CVD | 2.2520 | 2.2005 | 0.0000433 |
| Zinc selenide, CVD | 2.4331 | 2.4065 | 0.000060 |
| AMTIR I (Ge/As/SE:33/12/55) | 2.5141 | 2.4976 | 0.000072 |

In one embodiment, the application of a discrete or step zoom high performance MWIR lens allows for a remote sensor system having extended capabilities such as utilizing different fields of view, F # and resolution, depending on a particular application's requirements. A compact discrete zoom lens allows for a reduced size, weight, power and complexity (SWAP-C), and are useful in remote airborne platforms. Such zoom lenses also must provide high transmission, high resolution, low distortion and a flat image over a large field of view.

In certain embodiments, monochromatic and chromatic aberrations correction shall be done for the MWIR discrete zoom lens over the discrete zoom of 1.41× (i.e., over EFL range of 9 inches to 6.39 inches), over 5100 nm to 3300 nm wavelengths, and over the full fields of view of 33.8° to 46.34°, respectively. According to the principles of the present disclosure, the resolution of the lens is 8 µm, and has a F #2 for the focal length of 6.39 inches and a F #2.8 for the focal length of 9 inches.

One challenge for this lens is having a discretely zoomable angular field of view, which is required depending on the different mapping and surveillance requirements. There, the field of view is dependent on the airborne platform used, on the method of surveillance, and on the focal plane/detector resolution.

Figure 1C:
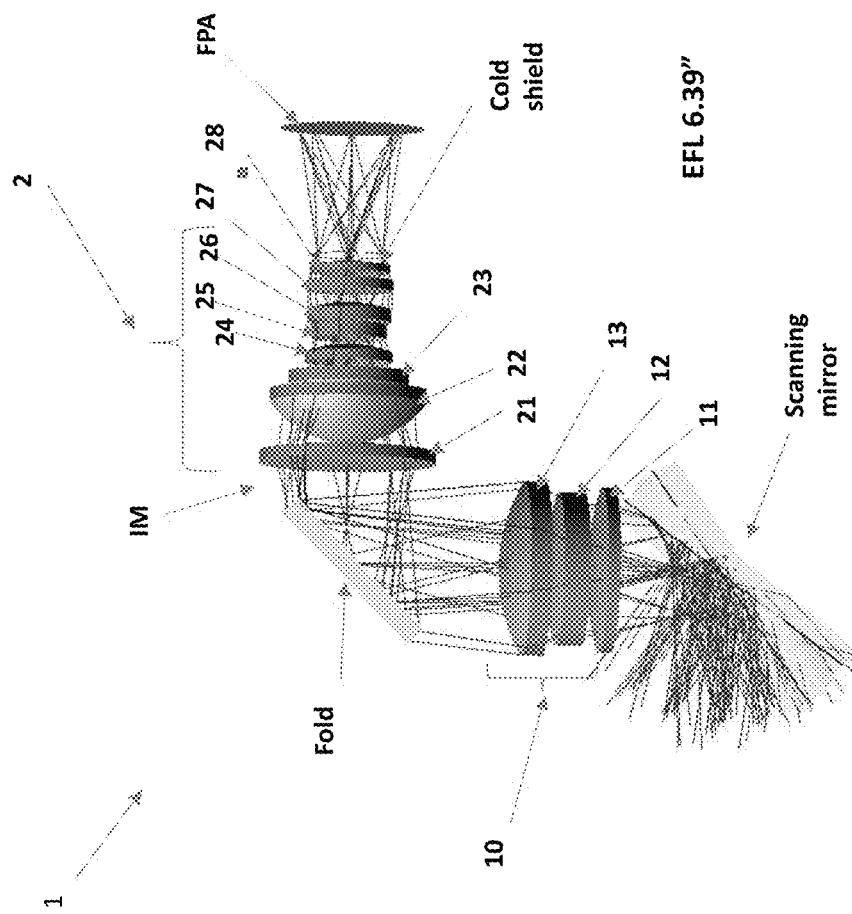

Referring to FIG. 1C and FIG. 1D, on embodiment of MWIR discrete zoom lens according to the present disclosure is shown. More specifically, one embodiment of the MWIR discrete zoom lens has a low F # of 2 and 2.8 for focal lengths of 6.39 inches and 9 inches, respectively. The system has a resolution of 8 µm and is corrected for monochromatic and chromatic aberrations over a 1.41× zoom range. In certain embodiments, the lens system consists of front and rear optical groups, where the front group is switchable. This lens is configured to be deployed in airborne platforms for remote sensing applications.

Still referring to FIG. 1C, at the focal length of 6.39 inches, the MWIR discrete zoom lens 1 includes a scanning mirror, a front first changeable optical group 10, a fold, a rear stationary optical group 2, a cold shield, and a focal pane array (FPA). In one embodiment, the distance from the cold shield to the focal plane is about 4.37 inches in order to meet the current industry standard dimensions for a cooled Dewar/focal plane assembly.

Still referring to FIG. 1D, at the focal length of 9 inches, the MWIR discrete zoom lens 1 includes a scanning mirror, a front second changeable optical group 20, a fold, a rear stationary optical group 2, a cold shield, and an FPA. In certain embodiments, the scanning mirror rotates around two axes with defined steps in order to cover a target completely while obtaining necessary ground samples.

The first changeable optical group 10 has a positive overall optical power and is configured to receive the light (i.e., MWIR radiation) from a remote object and to direct converged light onto the second optical group 2. A fold mirror between the first changeable group (10, 20) and the second optical group 2 is used to bend the optical path to make the optics more compact. An intermediate image (IM) is formed between the fold mirror and the second optical group 2. That allows correction of pupil spherical aberration, pupil coma, and pupil astigmatism across the field.

In certain embodiments, the first changeable group 10 comprises three optical elements having, in order from the object to the image plane, positive, negative, and positive optical powers correspondingly: a first element of the first changeable group 11, a second element of the first changeable group 12 and a third element of the first changeable group 13. The first optical element of the first changeable group 11 has a positive optical power and is made in a form of a positive meniscus whose concave surface faces toward the object. The first surface of the first element of the first changeable group 11 is formed aspherical in order to correct for spherical aberration for the low F # of 2 across the numerical aperture. In one embodiment, the first element is made of is silicon. The second element of the first changeable group 12 has a negative optical power and is made in a form of a concave meniscus lens whose concave surface faces toward the object. The second surface of the second element of the first changeable group 12 is formed aspherical in order to correct for spherical aberration and pupil spherical aberration across the field. In one embodiment, the second element of the first changeable group 12 is made of germanium. The third element of the first changeable group 13 has a positive optical power and is made in a form of positive meniscus whose concave surface faces toward the object. The second surface of the third element of the first changeable group 13 is formed aspherical in order to correct for coma across the field. In one embodiment, the third element of the first changeable group 13 is made of silicon.

The fold mirror directs the flux from the first changeable optical group 10 to the second optical group 2 in order to make the lens more compact and to fit the volume of the airborne sensor turret. The focal length of discrete zoom lens, which includes the first changeable group 10 and the second group 2 is 6.39 inches. The fold mirror position between the second changeable group 20 and the second optical group 2 is the same as for the configuration with the first changeable group 10. The fold mirror is used to bend the optical path to make the optics more compact. An intermediate image is formed between the fold mirror and the second optical group 2 at the same location as when using the first changeable group 10. That allows correction of the pupil spherical aberration, pupil coma, and pupil astigmatism across the field for both the 6.39 inch and the 9 inch focal length configurations.

The second changeable optical group 20 has a positive overall optical power and is configured to receive the light (i.e., MWIR radiation) from a remote object and to direct converged light onto the second optical group 2. The second changeable group 20 comprises three optical elements having, in order from the object to the image plane, positive, negative, and positive optical powers correspondingly: a first element of the second changeable group 201, a second element of the second changeable group 202 and a third element of the second changeable group 203. The first element of the second changeable group 201 has a positive optical power and is made in a form of a positive meniscus whose concave surface faces toward the image. The first surface of the first element of the second changeable group 201 is formed aspherical in order to correct for spherical aberration for the low F # of 2.8 across the numerical aperture. In one embodiment, the first element of the second changeable group 201 is made of silicon. The second element of the second changeable group 202 has a negative optical power and is made in a form of a concave meniscus lens whose concave surface faces toward the image. The first surface of the second element of the second changeable group 202 is formed aspherical in order to correct for spherical aberration and pupil spherical aberration across the field. In one embodiment, the second element of the second changeable group 202 is made of germanium. The third element of the second changeable group 203 has a positive optical power and is made in a form of positive meniscus whose concave surface faces toward the image. Both surfaces of the third element of the second changeable group 203 are spherical. In one embodiment, the third element of the second changeable group 203 is made of silicon. The focal length of the discrete zoom lens which includes a second changeable group 20 and a second group 2 is about 9 inches.

The second optical group 2 has an overall positive optical power and is configured to further converge the light from the first changeable optical group 10 and fold mirror and to direct the light onto the image plane FPA. One embodiment of the second group 2 comprises eight elements having in order from the object to the image plane positive, positive, negative, positive, negative, positive, positive, positive optical powers: first element of the second group 21, second element of the second group 22, third element of the second group 23, fourth element of the second group 24, fifth element of the second group 25, sixth element of the second group 26, seventh element of the second group 27 and eighth element of the second group 28, correspondingly.

The second group 2 conjugates an intermediate image plane (IM) with an image plane of the FPA. Magnification of the second group 2 is about 1× in order to correct for the axially symmetric aberrations, such as spherical aberration, field curvature, and longitudinal chromatic aberration.

The first element of the second group 21 is located close to the intermediate image (IM) and has a positive optical power; it is made in a form of a double convex lens. The first surface of the first element of the second group 21 is formed aspherical to correct for pupil coma and astigmatism. In one embodiment, the material of element 21 is silicon.

The second optical element of the second group 22 has a positive optical power and is made in a form of a positive meniscus whose concave surface faces toward the image. The second surface of the second element of the second group 22 is formed aspherical in order to correct for high order spherical aberration and coma. In one embodiment, the material of element 22 is silicon.

The third optical element of the second group 23 has a negative optical power and is made in a form of a negative meniscus whose concave surface faces toward the image. The first surface of the third element of the second group 23 is formed aspherical to correct for high order coma. In one embodiment, the material of the element 23 is germanium.

The fourth optical element of the second group 24 has a positive optical power and is made in a form of a positive meniscus whose concave surface faces toward the object. The second surface of the fourth element of the second group 24 is formed spherical to correct for sagittal astigmatism. In one embodiment, the material of element 24 is germanium.

The fifth optical element of the second group 25 has a negative optical power and is made in a form of a positive meniscus whose concave surface faces toward the object. The second surface of the fifth element of the second group 25 is formed spherical to correct for high order astigmatism and field curvature. In one embodiment, the material of element 25 is germanium.

The sixth optical element of the second group 26 has a positive optical power and is made in a form of a positive meniscus whose concave surface faces toward the object. The second surface of the sixth element of the second group 26 is formed spherical to correct for high order residual coma and tangential astigmatism. In one embodiment, the material of element 26 is silicon.

The seventh optical element of the second group 27 has a positive optical power and is made in a form of a positive meniscus whose concave surface faces toward the image. The second surface of the seventh element of the second group 27 is formed spherical to correct for high order residual coma. In one embodiment, the material of element 27 is silicon.

The eighth optical element of the second group 28 has a positive optical power and is made in a form of a positive meniscus whose concave surface faces toward the object. The second surface of the eighth element of the second group 28 is formed spherical to correct for high order field curvature and astigmatism. In one embodiment, the material of element 28 is silicon.

The cold shield, which is the hard aperture stop, is positioned between the optical group 2 and the FPA. The distance from the aperture stop (length of the cold shield) to the FPA is 4.37".

The following relations among the first and second changeable groups 10 and 20 and optical group 2 and their constituent optical elements have been found to achieve monochromatic and chromatic aberrational correction across the field along with 100% cold shield efficiency Configuration 1—includes a first changeable group 10 and a second group 2, with a lens focal length of 6.39 inches.

$0.85 < F_{L1}/F_{CG1} < 1.15$ $0.90 < F_{L1}/F_{G2} < 1.20$ $3.55 < OAL/F_{L1} < 3.95$ $0.90 < F_{CG1}/F_{11} < 1.10$ $-1.45 < F_{CG1}/F_{12} < -1.20$ $1.20 < F_{CG1}/F_{13} < 1.45$ $0.65 < F_{G2}/F_{21} < 0.85$ $1.40 < F_{G2}/F_{22} < 1.70$ $-2.35 < F_{G2}/F_{23} < -2.15$ $1.10 < F_{G2}/F_{24} < 1.30$ $-3.15 < F_{G2}/F_{25} < -2.95$ $2.30 < F_{G2}/F_{26} < 2.55$ $0.10 < F_{G2}/F_{27} < 0.30$ $1.35 < F_{G2}/F_{28} < 1.70$ $1.35 < F_{L1}/CSD < 1.55$ $2.50 < V_{11}/V_{12} < 2.70$ $0.90 < V_{11}/V_{13} < 1.20$ $0.90 < V_{21}/V_{22} < 1.20$ $2.50 < V_{21}/V_{23} < 2.70$ $2.50 < V_{21}/V_{24} < 2.70$ $2.50 < V_2/V_{25} < 2.70$ $0.90 < V_{21}/V_{26} < 1.20$ $0.90 < V_{21}/V_{27} < 1.20$ $0.90 < V_{21}/V_{28} < 1.20$

Configuration 2—includes a second changeable group 20 and a second group 2, where the second group is common for both configurations. Here, a lens focal length is 9 inches.

$0.90 < F_{L2}/F_{CG2} < 1.10$ $1.45 < F_{L2}/F_{G2} < 1.65$ $2.50 < OAL/F_{L1} < 2.70$ $1.55 < F_{CG2}/F_{201} < 1.65$ $-1.15 < F_{CG2}/F_{202} < -0.85$ $1.40 < F_{CG2}/F_{203} < 1.65$ $1.90 < F_{L1}/CSD < 2.15$ $2.50 < V_{201}/V_{202} < 2.70$ $0.90 < V_{21}/V_{203} < 1.20$, wherein:

$F_{L1}$ is the focal length of the lens according to the first configuration.

$F_{L2}$ is the focal length of the lens according to the second configuration.

$F_{CG1}$ is the focal length of the first changeable group according to the first configuration.

$F_{CG2}$ is the focal length of the second changeable group according to the second configuration.

$F_{G2}$ is the focal length of the second group, which is common for both configurations.

OAL is the overall length of the lens.

CSD is the cold shield distance from the aperture stop to the focal plane array FPA.

$F_{11}$, $F_{12}$, $F_{13}$ are focal length of the first, second and third elements of the first changeable group.

$F_{201}$, $F_{201}$, $F_{203}$ are the focal lengths of the first, second and third optical elements of the second changeable group.

$F_{21}$, $F_{22}$, $F_{23}$, $F_{24}$, $F_{25}$, $F_{26}$, $F_{27}$, $F_{28}$ are the focal lengths of the first, second, third, fourth, fifth, sixth, seventh and eighth optical elements of the second common group.

$V_{11}$, $V_{12}$, $V_{13}$ are the Abbe numbers of the first, second and third optical elements of the first changeable group.

$V_{201}$, $V_{202}$, $V_{203}$ are the Abbe numbers of the first, second and third optical elements of the second changeable group.

$V_{21}$, $V_{22}$, $V_{23}$, $V_{24}$, $V_{25}$, $V_{26}$, $V_{27}$, $V_{28}$ are the Abbe numbers of the first, second, third, fourth, fifth, sixth, seventh and eighth optical elements of the second common group.

In one embodiment of the discrete zoom lens of the present disclosure, first and second changeable groups 10 and 20 and second common group 2 provide a lens with discrete focal lengths of 6.39 and 9 inches along with a 100% efficient cold shield. There, the distance from the cold shield to the FPA plane is constant and is 4.37 inches. These relations provide monochromatic aberrations correction, distortion correction, and Petzval curvature correction for two different configurations: a F #2 and focal length of 6 inches, and a F #2.8 and focal length of 9 inches. More specifically, on-axis spherical aberration and off-axis aberrations such as coma, astigmatism, and high order field curvature are corrected with the combination of the groups and elements optical powers, shapes, and refractive indices. The lens is orthoscopic and has a very low distortion (i.e., less than 1%). The combination of optical elements materials' dispersions allows axial chromatic aberration correction along with a lateral color correction.

Figure 2A:
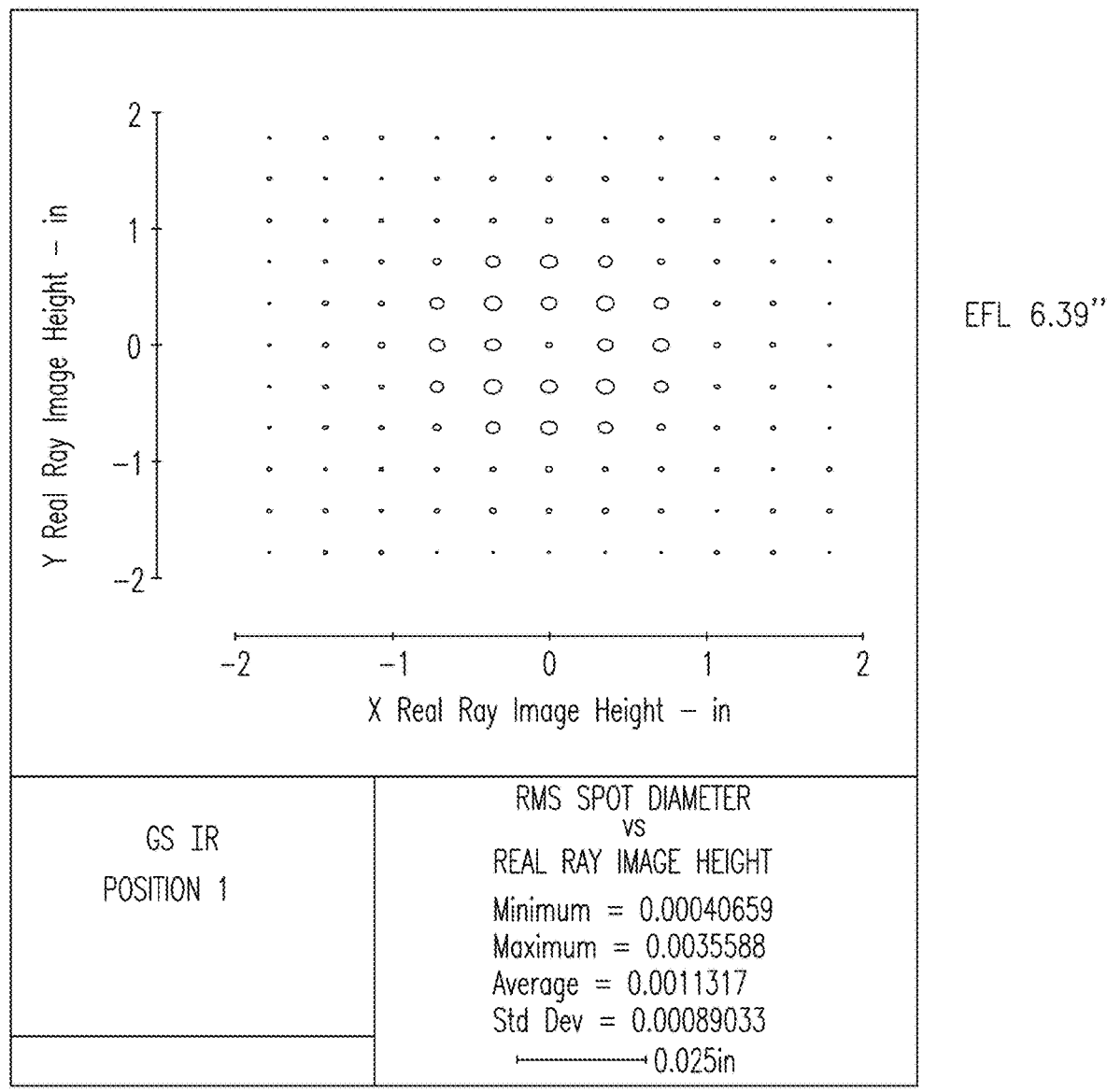
FIG. 2A and FIG. 2B show wavefront root mean square (RMS) data for one embodiment of the discrete zoom lens according to the principles of the present disclosure.
Figure 2B:
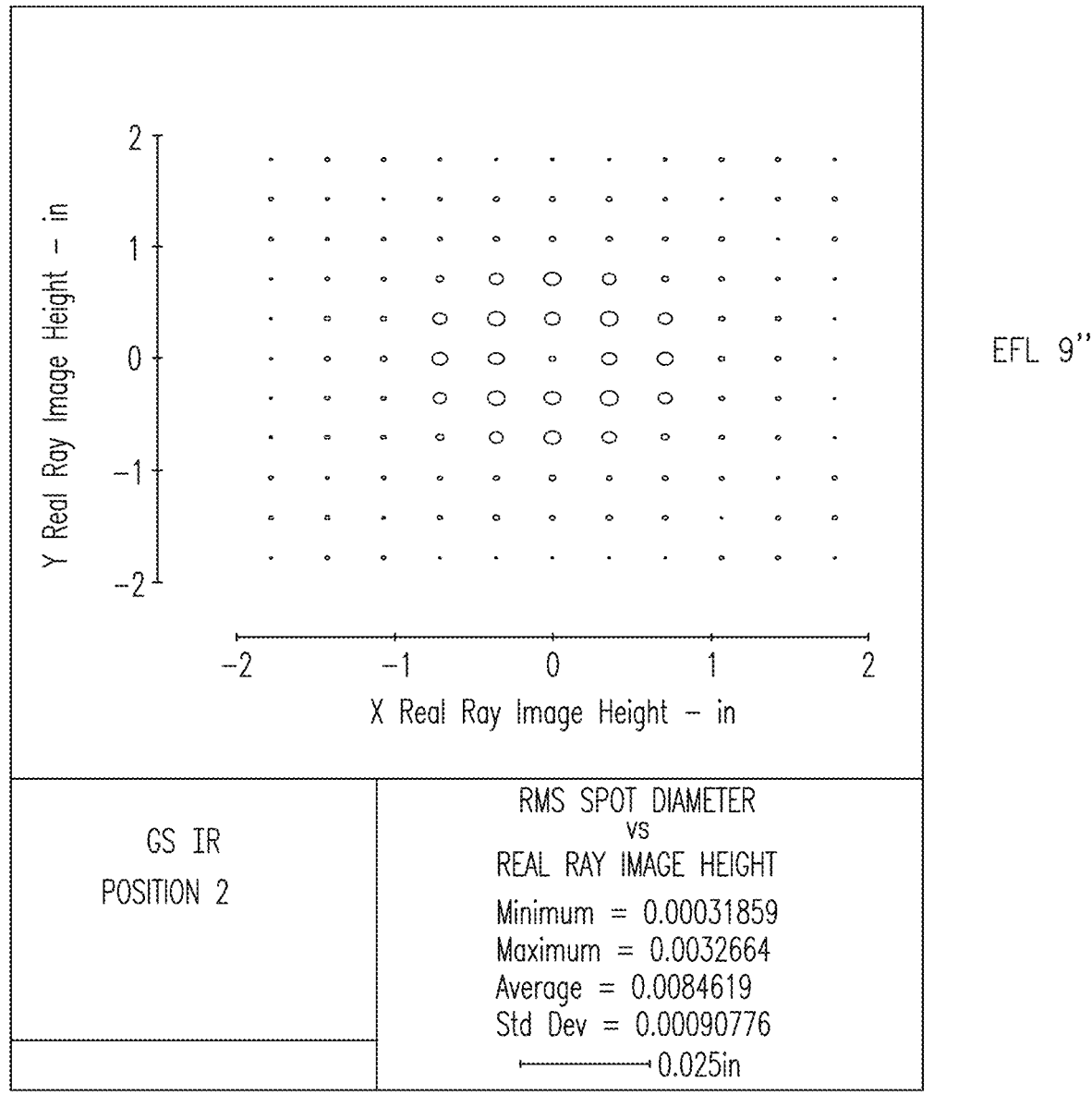

Referring to FIG. 2A and FIG. 2B, wavefront RMS spot diameter graphs for both focal lengths 6.39- and 9-inch configurations are shown. More specifically, the wavefront is symmetric and corrected across the whole field.

Figure 3A:
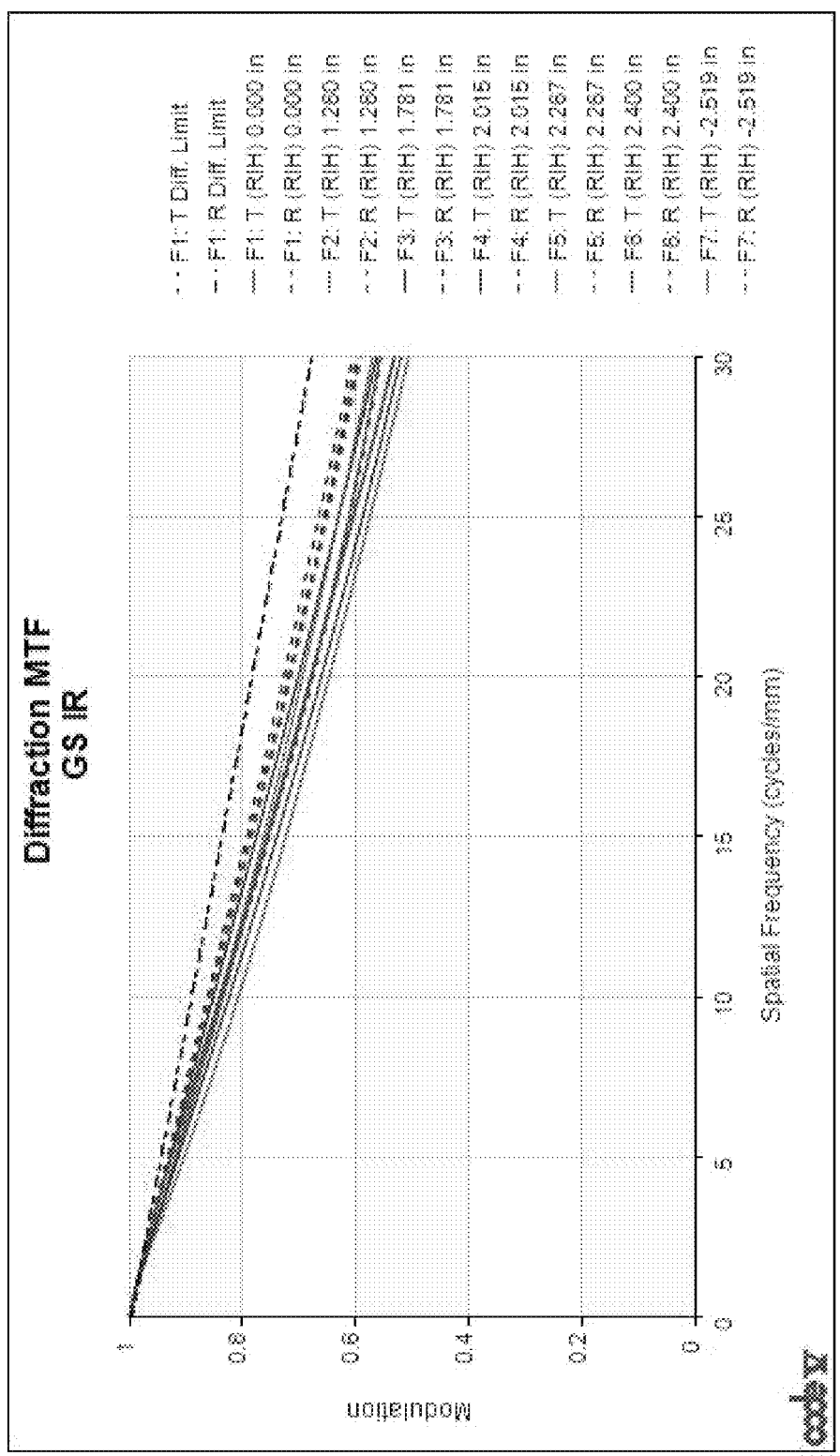
FIG. 3A and FIG. 3B shows modulation transfer function (MTF) data for one embodiment of the discrete zoom lens according to the principles of the present disclosure.
Figure 3B:
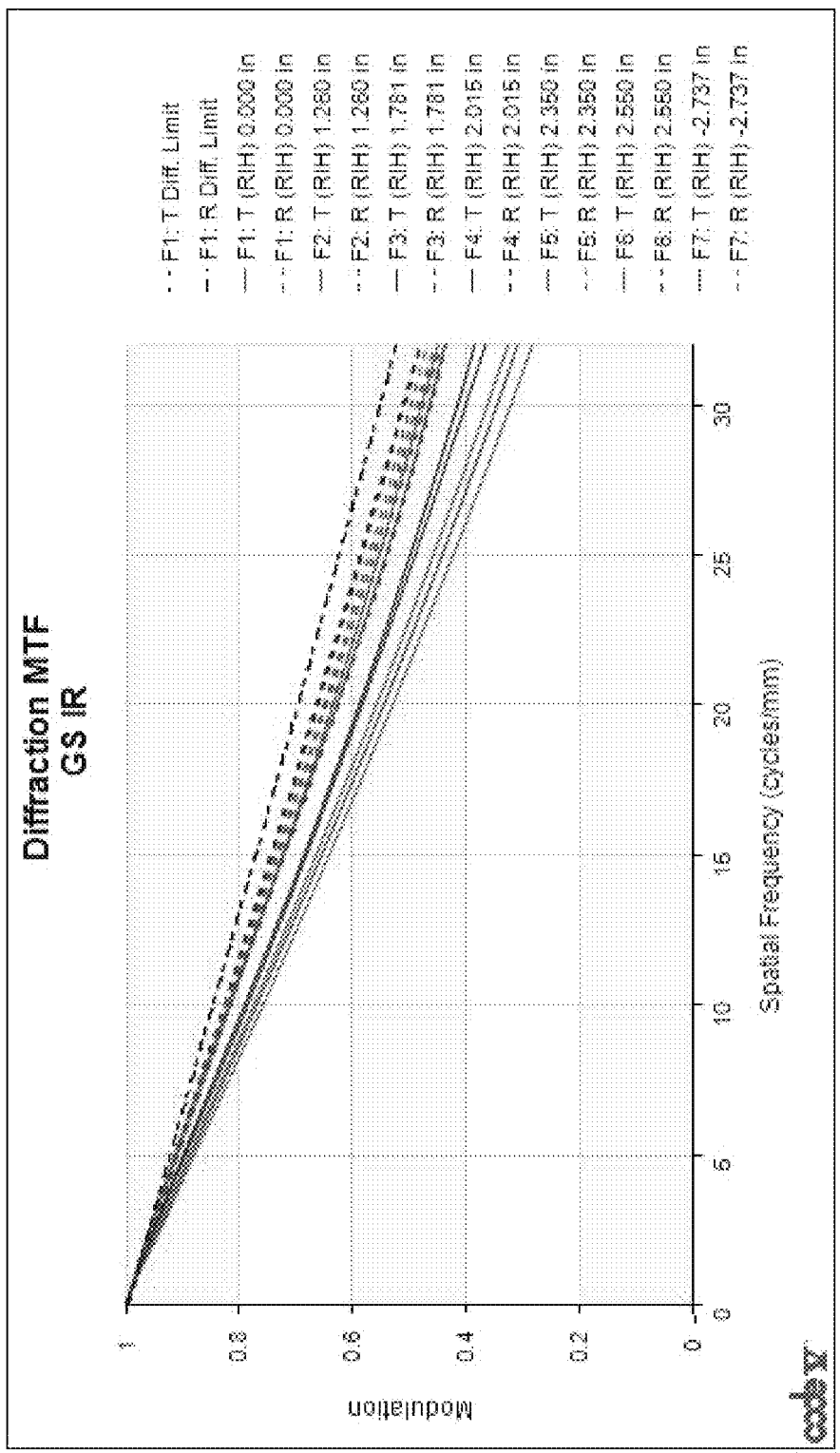

Referring to FIG. 3A and FIG. 3B, polychromatic MTF curves across the field for both focal lengths 6.39- and 9-inch configurations are shown. More specifically, the MTF numbers exceed specification for both focal length 6.39- and 9-inch configurations, so the discrete zoom lens is well corrected across the MWIR spectrum of 5.1 nm-3.3 nm.

Figure 4B:
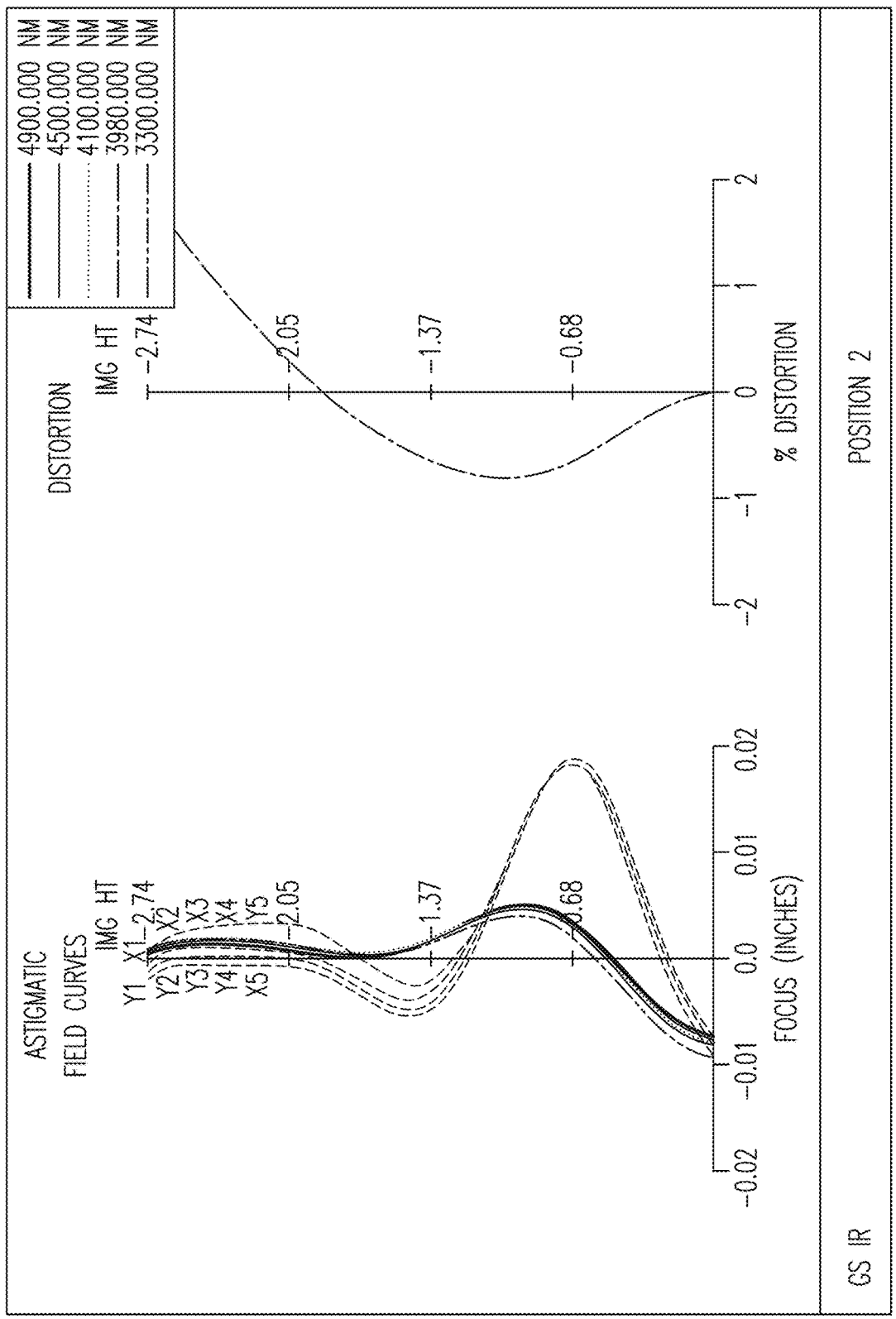

Referring to FIG. 4A and FIG. 4B, astigmatic field curves and distortion graphs for both focal lengths 6.39- and 9-inch configurations are shown. More specifically, astigmatism is low and is well corrected across the field. Distortion is corrected across the field for both configurations and residual distortion does not exceed 1.1%.

Figure 5A:
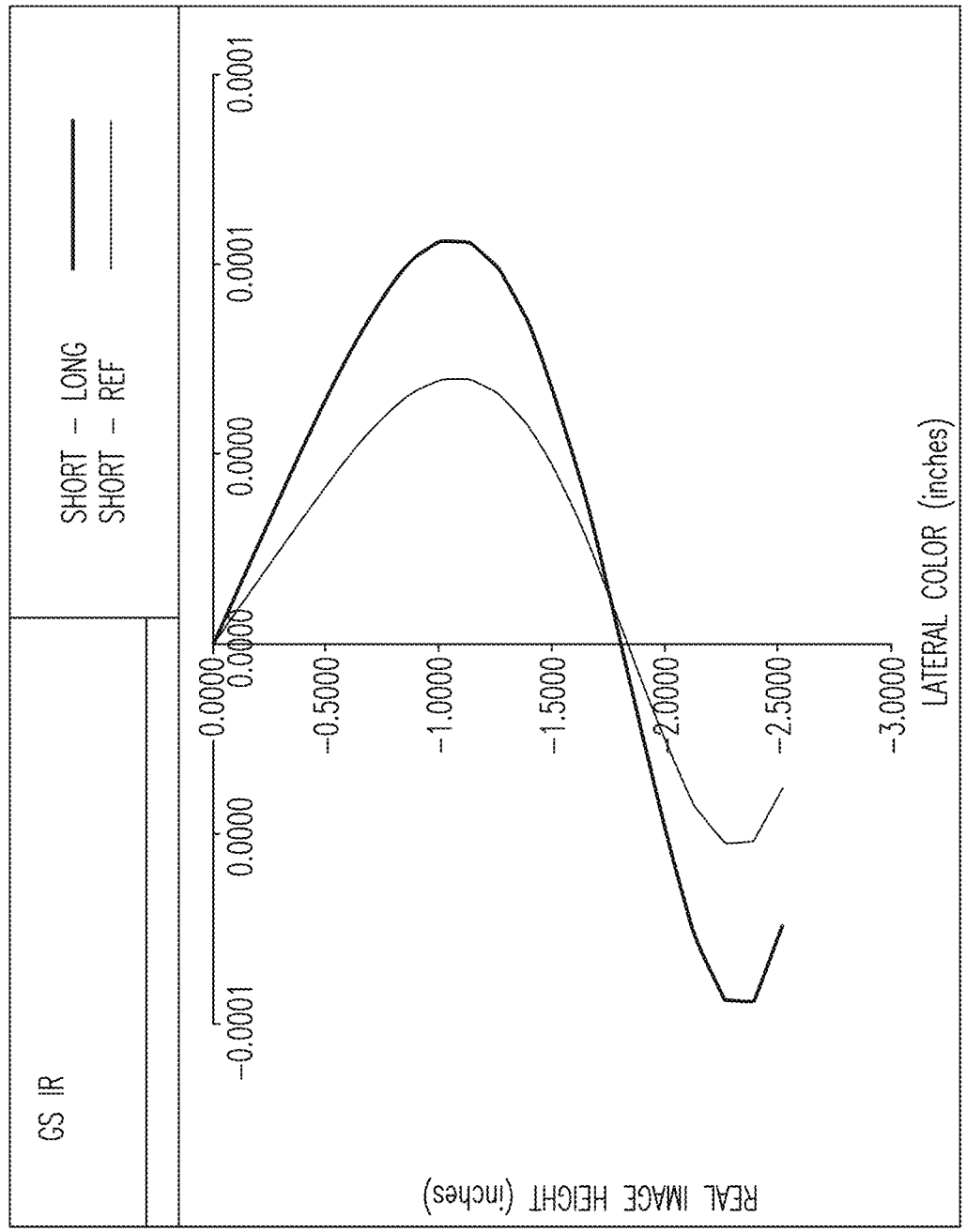
FIG. 5A and FIG. 5B shows lateral color data for one embodiment of the discrete zoom lens according to the principles of the present disclosure.
Figure 5B:
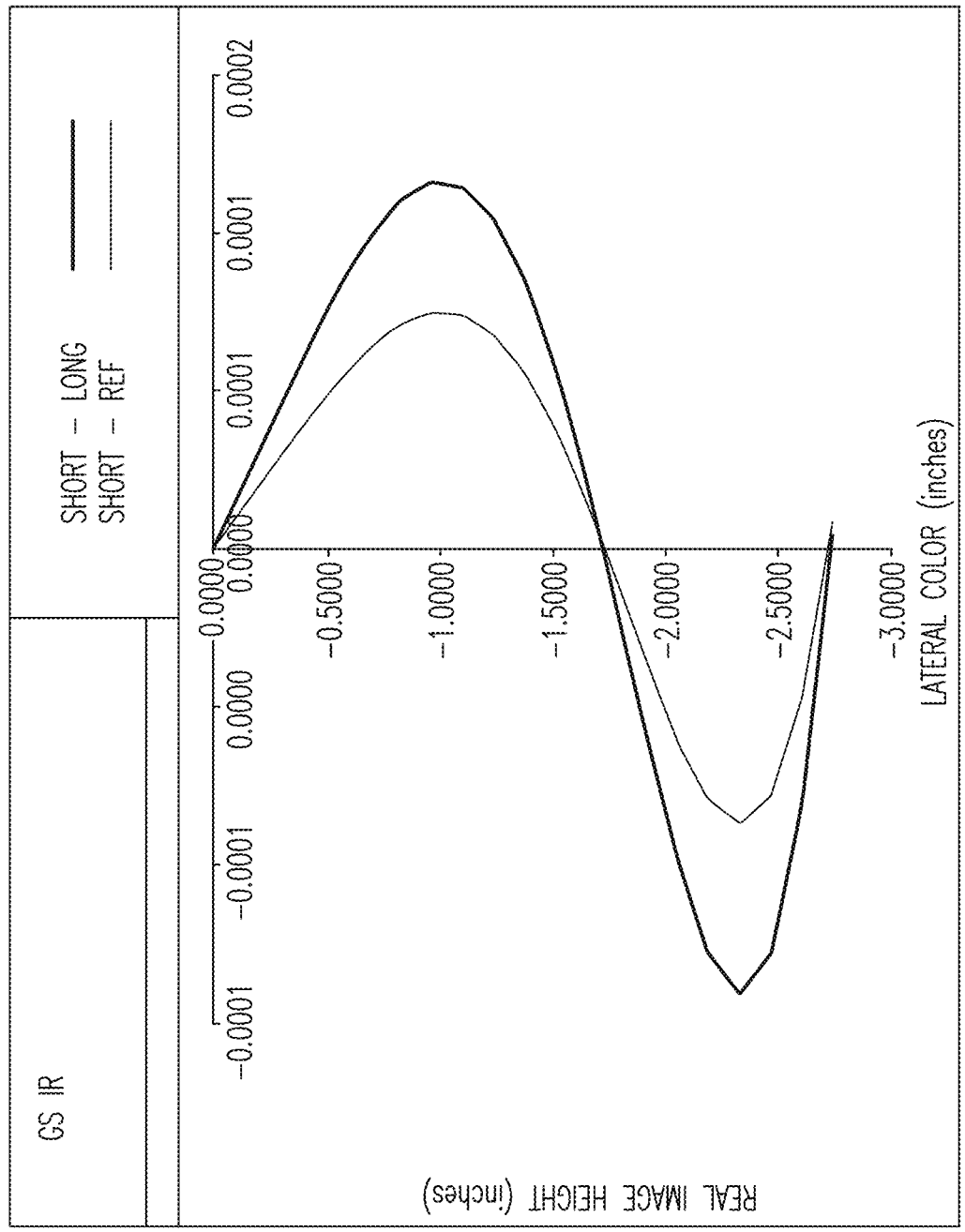

Referring to FIG. 5A and FIG. 5B, lateral color graphs for both focal lengths 6.39- and 9-inch configurations are shown. More specifically, lateral color is apochromatic correction across the field and does not exceed 0.00008 inches.

Figure 6A:
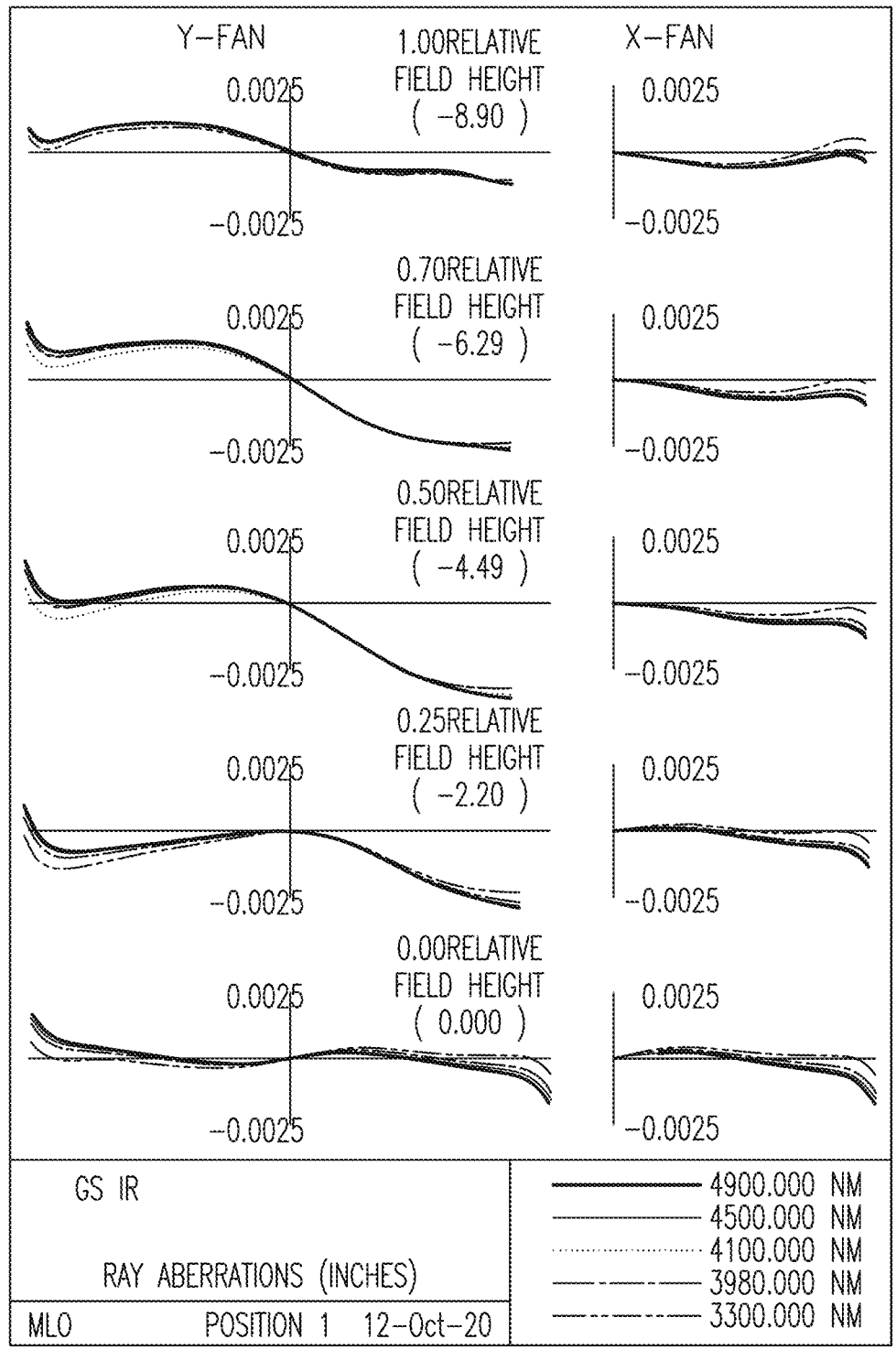

Referring to FIG. 6A and FIG. 6B, RIM RAY curves graphs for both 6.39- and 9-inch configurations are shown. More specifically, the transverse monochromatic and polychromatic aberrations are well corrected across the whole field.

A prescription for one embodiment of the discrete zoom lens is presented below, and the equation for the form of asphere surfaces is shown in FIG. 7.

```
OBJ: INFINITY INFINITY
1: INFINITY 3.000000
2: INFINITY 0.000000
3: INFINITY -4.000000 REFL
SLB: "PRISM or MIRROR"
```

-continued

```
XDE: 0.000000 YDE: 0.000000 ZDE: 0.000000 BEN
XDC: 100 YDC: 100 ZDC: 100
ADE: -45.000000 BDE: 0.000000 CDE: 0.000000
ADC: 100 BDC: 100 CDC: 100
4: 28.08621 -0.861391 SILICON_SPECIAL
ASP:
K : 0.000000 KC: 100
CUF: 0.000000 CCF: 100
A :0.570905E-04 B :-.545987E-04 C :0.356814E-05 D :0.308533E-08
AC: 0 BC: 0 CC: 0 DC: 0
E :-.674626E-08 F :0.000000E+00 G :0.000000E+00 H :0.000000E+00
EC: 0 FC: 100 GC: 100 HC: 100
J :0.000000E+00
JC: 100
5: 8.52647 -0.664296
6: 4.59241 -0.499972 GERMMW_SPECIAL
7: 7.45262 -0.949414
ASP:
K : 0.000000 KC: 100
CUF: 0.000000 CCF: 100
A :-.955962E-03 B :-.696557E-04 C :0.370661E-06 D :0.501907E-06
AC: 0 BC: 0 CC: 0 DC: 0
E :-.197681E-07 F :0.000000E+00 G :0.000000E+00 H :0.000000E+00
EC: 0 FC: 100 GC: 100 HC: 100
J :0.000000E+00
JC: 100
8: 11.10666 -1.475027 SILICON_SPECIAL
9: 6.73087 -4.869900
ASP:
K : 0.000000 KC: 100
CUF: 0.000000 CCF: 100
A :0.209145E-03 B :0.344286E-05 C :-.106824E-06 D :0.308346E-08
AC: 0 BC: 0 CC: 0 DC: 0
E :-.777458E-10 F :0.000000E+00 G :0.000000E+00 H :0.000000E+00
EC: 0 FC: 100 GC: 100 HC: 100
J :0.000000E+00
JC: 100
10: INFINITY 3.899786 REFL
XDE: 0.000000 YDE: 0.000000 ZDE: 0.000000 BEN
XDC: 100 YDC: 100 ZDC: 100
ADE: 38.000000 BDE: 0.000000 CDE: 0.000000
ADC: 100 BDC: 100 CDC: 100
11: 30.80046 0.000000
12: 30.80046 0.000000
13: 30.80046 0.700000 SILICON_SPECIAL 0 100
ASP:
K : 0.000000 KC: 100
CUF: 0.000000 CCF: 100
A :0.553372E-03 B :-.147890E-03 C :0.139554E-04 D :-.996787E-06
AC: 0 BC: 0 CC: 0 DC: 0
E :0.366945E-07 F :0.000000E+00 G :0.000000E+00 H :0.000000E+00
EC: 0 FC: 100 GC: 100 HC: 100
J :0.000000E+00
JC: 100
14: -23.24466 0.050000
15: 2.93785 0.816234 SILICON_SPECIAL
ASP:
K : 0.000000 KC: 100
CUF: 0.000000 CCF: 100
A :-.354236E-02 B :0.249952E-03 C :-.242017E-03 D :0.389443E-04
AC: 0 BC: 0 CC: 0 DC: 0
E :-.199454E-05 F :0.000000E+00 G :0.000000E+00 H :0.000000E+00
EC: 0 FC: 100 GC: 100 HC: 100
J :0.000000E+00
JC: 100
16: 3.41009 0.132018
17: 3.23360 0.500000 GERMMW_SPECIAL
ASP:
K : 0.000000 KC: 100
CUF: 0.000000 CCF: 100
A :0.445394E-02 B :0.110630E-02 C :-.769555E-04 D :0.770136E-05
AC: 0 BC: 0 CC: 0 DC: 0
E :-.687466E-05 F :0.000000E+00 G :0.000000E+00 H :0.000000E+00
EC: 0 FC: 100 GC: 100 HC: 100
J :0.000000E+00
JC: 100
18: 1.80079 1.051184
19: -27.53708 0.400075 GERMMW_SPECIAL
20: -9.87223 0.572082
```

```
ASP:
K : 0.000000 KC: 100
CUF: 0.000000 CCF: 100
A :0.762813E-03 B :-.729556E-03 C :0.359269E-03 D :-.216577E-03
AC: 0 BC: 0 CC: 0 DC: 0
E :0.501977E-04 F :0.000000E+00 G :0.000000E+00 H :0.000000E+00
EC: 0 FC: 100 GC: 100 HC: 100
J :0.000000E+00
JC: 100
21: -2.59896 0.300000 GERMMW_SPECIAL
22: -4.44281 0.040000
ASP:
K : 0.000000 KC: 100
CUF: 0.000000 CCF: 100
A :0.558357E-02 B :0.468980E-03 C :-.405160E-03 D :0.494597E-04
AC: 0 BC: 0 CC: 0 DC: 0
E :-.110146E-04 F :0.000000E+00 G :0.000000E+00 H :0.000000E+00
EC: 0 FC: 100 GC: 100 HC: 100
J :0.000000E+00
JC: 100
23: -6.92678 0.627451 SILICON_SPECIAL
24: -3.91563 0.052610
ASP:
K : 0.000000 KC: 100
CUF: 0.000000 CCF: 100
A :-.191066E-02 B :0.131366E-03 C :0.132465E-03 D :-.609932E-04
AC: 0 BC: 0 CC: 0 DC: 0
E :0.126737E-04 F :0.000000E+00 G :0.000000E+00 H :0.000000E+00
EC: 0 FC: 100 GC: 100 HC: 100
J :0.000000E+00
JC: 100
25: 5.09627 0.447341 SILICON_SPECIAL
26: 6.79080 0.361981
ASP:
K : 0.000000 KC: 100
CUF: 0.000000 CCF: 100
A :-.878984E-03 B :-.158884E-03 C :-.165307E-03 D :0.142912E-03
AC: 0 BC: 0 CC: 0 DC: 0
E :-.441880E-04 F :0.000000E+00 G :0.000000E+00 H :0.000000E+00
EC: 0 FC: 100 GC: 100 HC: 100
J :0.000000E+00
JC: 100
27: -21.77778 0.321729 SILICON_SPECIAL
28: -8.28287 0.200000
ASP:
K : 0.000000 KC: 100
CUF: 0.000000 CCF: 100
A :0.16501 IE-03 B :0.227684E-03 C :0.265084E-03 D :-.159995E-03
AC: 0 BC: 0 CC: 0 DC: 0
E :0.454008E-04 F :0.000000E+00 G :0.000000E+00 H :0.000000E+00
EC: 0 FC: 100 GC: 100 HC: 100
J :0.000000E+00
JC: 100
STO: INFINITY 4.527508
30: INFINITY 0.000000
IMG: INFINITY 0.000000
FNO 2.00000
DIM IN
WL 4900.00 4500.00 4100.00 3980.00 3300.00
REF 3
WTW 60 100 80 70 30
INI MLO
XRI 0.00000 0.00000 0.00000 0.00000 0.00000
YRI 0.00000 0.25000 0.50000 0.70000 1.00000
WTF 1.00000 2.40000 2.40000 2.00000 1.00000
VUX 0.00000 0.02296 0.03724 0.04363 0.05051
VLX 0.00000 0.02296 0.03724 0.04363 0.05051
VUY 0.00000 0.13461 0.18529 0.20556 0.22591
VLY 0.00000 -0.04588 -0.05289 -0.05092 -0.04871
Aim Point (S1): X: 0.00000 Y: 0.22987
POL N
APERTURE DATA/EDGE DEFINITIONS
CA
CIRS29 1.173404 ![A1]
REFRACTIVE INDICES
GLASS CODE 4900.00 4500.00 4100.00 3980.00 3300.00
SILICON_SPECIA 3.422498 3.423568 3.424982 3.425495 3.429572
GERMMW_SPECIAL 4.016060 4.019220 4.023369 4.024870 4.036818
No solves defined in system
POS 1 POS 2 ZOOM DATA
FNO 2.00000 2.80000
YRI F5 1.00000 2.35000
WTF F4 2.00000 1.10000
WTF F5 1.00000 2.00000
THI S3 -4.00000 -3.80000
THC S3 100 0
RDY S4 28.08621 -9.24947
CCY S4 0 0
THI S4 -0.86139 -0.70000
THC S4 0 100
A S4 0.5709E-04 -0.1888E-03
AC S4 0 0
B S4 -0.5460E-04 -0.5142E-05
BC S4 0 0
C S4 0.3568E-05 0.1294E-05
CC S4 0 0
D S4 0.3085E-08 -0.5788E-07
DC S4 0 0
E S4 -0.6746E-08 0.1219E-08
EC S4 0 0
RDY S5 8.52647 -20.96352
CCY S5 0 0
THI S5 -0.66430 -0.07000
THC S5 0 0
RDYS6 4.59241 -10.22811
CCY S6 0 0
THI S6 -0.49997 -0.50000
THC S6 100 100
RDY S7 7.45262 -7.13966
CCY S7 0 0
A S7 -0.9560E-03 -0.4263E-03
AC S7 0 0
B S7 -0.6966E-04 -0.1609E-04
BC S7 0 0
C S7 0.3707E-06 0.2056E-05
CC S7 0 0
D S7 0.5019E-06 -0.7180E-07
DC S7 0 0
E S7 -0.1977E-07 0.1758E-08
EC S7 0 0
THI S7 -0.94941 -3.50000
THC S7 0 100
RDY S8 11.10666 -7.36370
CCY S8 0 0
THI S8 -1.47503 -0.70000
THC S8 0 100
RDY S9 6.73087 -9.21070
CCY S9 0 0
THI S9 -4.86990 -4.05000
THC S9 0 0
A S9 0.2091E-03 -0.1087E-04
AC S9 0 0
B S9 0.3443E-05 -0.9055E-05
BC S9 0 0
C S9 -0.1068E-06 0.2230E-06
CC S9 0 0
D S9 0.3083E-08 -0.2510E-07
DC S9 0 0
E S9 -0.7775E-10 0.7324E-09
EC S9 0 0
CIR S29 1.17340 0.82371
POS 1 POS 2 INFINITE CONJUGATES
EFL -6.3900 -9.0000
BFL -0.0076 -0.0080
FFL -5.1530 -17.7204
FNO -2.0000 -2.8000
IMG DIS 0.0000 0.0000
OAL 4.6800 4.6800
PARAXIAL IMAGE
HT 1.0081 2.3247
ANG 8.9655 14.4830
ENTRANCE PUPIL
```

-continued

```
DIA    3.1950   3.2143
THI    3.8809   0.2018
EXIT PUPIL
DIA    2.2599   1.6141
THI   -4.5275  -4.5275
STO DIA 2.3465  1.6472
```

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the disclosure. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of various embodiments of the disclosure are examples and the disclosure is not limited to the exact details shown or described.

While various embodiments of the present disclosure have been described in detail, it is apparent that various modifications and alterations of those embodiments will occur to and be readily apparent to those skilled in the art. However, it is to be expressly understood that such modifications and alterations are within the scope and spirit of the present disclosure, as set forth in the appended claims. Further, the disclosure(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A discrete zoom lens, with elements arranged in order from a remote object to an image plane, comprising:
   a scanning mirror;
   a first group having a positive optical power, the first group comprising one of a first changeable optical group according to a first configuration and a second changeable optical group according to a second configuration, wherein the first changeable optical group and the second changeable optical group are configured to be interchangeable to provide different properties for the discrete zoom lens;
   a fold mirror;
   a second group having a positive optical power;
   an aperture stop; and
   a focal plane array;
   wherein the discrete zoom lens having the first changeable optical group has a focal length of 6.39 inches and the discrete zoom lens having the second changeable optical group has a focal length of 9 inches.

2. The discrete zoom lens according to claim 1, wherein the first group is configured to receive light from the remote object and to direct converged light onto the second group, the first group comprising three optical elements having in order from the remote object to the image plane positive, negative, and positive optical powers.

3. The discrete zoom lens according to claim 1, wherein both the first group creates an intermediate image before the second group and the fold mirror is configured to bend an optical axis between the first group and the second group.

4. The discrete zoom lens according to claim 1, wherein the second group comprises eight elements having in order from the remote object to the image plane positive, positive, negative, positive, negative, positive, positive, positive optical powers.

5. The discrete zoom lens according to claim 1, wherein a cold shield is the aperture stop and is positioned between the second group and the focal plane array, a distance from the cold shield to the focal plane array is 4.37 inches.

6. The discrete zoom lens according to claim 1, wherein the first configuration for the first changeable optical group comprises:

$0.85 < F_{L1}/F_{CG1} < 1.15$ $0.90 < F_{L1}/F_{G2} < 1.20$ $3.55 < OAL/F_{L1} < 3.95$ $0.90 < F_{CG1}/F_{11} < 1.10$ $-1.45 < F_{CG1}/F_{12} < -1.20$ $1.20 < F_{CG1}/F_{13} < 1.45$ $0.65 < F_{G2}/F_{21} < 0.85$ $1.40 < F_{G2}/F_{22} < 1.70$ $-2.35 < F_{G2}/F_{23} < -2.15$ $1.10 < F_{G2}/F_{24} < 1.30$ $-3.15 < F_{G2}/F_{25} < -2.95$ $2.30 < F_{G2}/F_{26} < 2.55$ $0.10 < F_{G2}/F_{27} < 0.30$ $1.35 < F_{G2}/F_{28} < 1.70$ $1.35 < F_{L1}//CSD < 1.55$ $2.50 < V_{11}/V_{12} < 2.70$ $0.90 < V_{11}/V_{13} < 1.20$ $0.90 < V_{21}/V_{22} < 1.20$ $2.50 < V_{21}/V_{23} < 2.70$ $2.50 < V_{21}/V_{24} < 2.70$ $2.50 < V_{21}/V_{25} < 2.70$ $0.90 < V_{21}/V_{26} < 1.20$ $0.90 < V_{21}/V_{27} < 1.20$ $0.90 < V_{21}/V_{28} < 1.20$, wherein:
$F_{L1}$ is a focal length of a lens according to the first configuration,
$F_{CG1}$ is a focal length of the first changeable optical group,
$F_{CG2}$ is a focal length of the second group,
OAL is an overall length of a lens,
CSD is a cold shield distance from the aperture stop to the focal plane array,
$F_{11}$, $F_{12}$, $F_{13}$ are focal length of first, second and third optical elements of the first changeable optical group,
$F_{21}$, $F_{22}$, $F_{23}$, $F_{24}$, $F_{25}$, $F_{26}$, $F_{27}$, $F_{28}$ are focal lengths of first, second, third, fourth, fifth, sixth, seventh and eighth optical elements of the second group,
$V_{11}$, $V_{12}$, $V_{13}$ are the Abbe numbers of the first, second and third optical elements of the first changeable optical group, and
$V_{21}$, $V_{22}$, $V_{23}$, $V_{24}$, $V_{25}$, $V_{26}$, $V_{27}$, $V_{28}$ are the Abbe numbers of the first, second, third, fourth, fifth, sixth, seventh and eighth optical elements of the second group.

7. The discrete zoom lens according to claim 1, wherein the second configuration for the second changeable optical group comprises:

$0.90 < F_{L2}/F_{CG2} < 1.10$ $1.45 < F_{L2}/F_{G2} < 1.65$ $2.50 < OAL/F_{L1} < 2.70$ $1.55 < F_{CG2}/F_{201} < 1.65$ $-1.15 < F_{CG2}/F_{202} < -0.85$ $1.40 < F_{CG2}/F_{203} < 1.65$ $1.90 < F_{L1}//CSD < 2.15$ $2.50 < V_{201}/V_{202} < 2.70$ $0.90 < V_{21}/V_{203} < 1.20$, –wherein $F_{L1}$ is a focal length of a lens according to the first configuration,
$F_{L2}$ is a focal length of a lens according to the second configuration,
$F_{CG2}$ is a focal length of the second changeable optical group according to the second configuration,
$F_{G2}$ is a focal length of the second group,
OAL is an overall length of a lens,
CSD is a cold shield distance from the aperture stop to the focal plane array,
$F_{201}$, $F_{201}$, $F_{203}$ are focal lengths of first, second and third optical elements of the second changeable optical group,
$F_{21}$, $F_{22}$, $F_{23}$, $F_{24}$, $F_{25}$, $F_{26}$, $F_{27}$, $F_{28}$ are focal lengths of first, second, third, fourth, fifth, sixth, seventh and eighth optical elements of the second group,
$V_{201}$, $V_{202}$, $V_{203}$ are the Abbe numbers of the first, second and third optical elements of the second changeable optical group, and
$V_{21}$, $V_{22}$, $V_{23}$, $V_{24}$, $V_{25}$, $V_{26}$, $V_{27}$, $V_{28}$ are the Abbe numbers of the first, second, third, fourth, fifth, sixth, seventh and eighth optical elements of the second group.

8. A discrete zoom lens, with elements arranged in order from a remote object to an image plane, comprising:
a scanning mirror;
a first group having one of the following:
a first changeable optical group having a positive optical power, wherein the first changeable optical group is configured to receive light from the remote object and to direct converged light onto the second group, the first changeable optical group comprising three optical elements having in order from the remote object to the image plane positive, negative, and positive optical powers; or
a second changeable optical group having a positive optical power, wherein the second changeable optical group is configured to receive light from the remote object and to direct converged light onto the second group, the second changeable optical group comprising three optical elements having in order from the remote object to the image plane positive, negative, and positive optical powers;
a fold mirror;
a second group having a positive optical power, wherein the second group comprises eight elements having in order from the remote object to the image plane positive, positive, negative, positive, negative, positive, positive, positive optical powers;
an aperture stop; and
a focal plane array;
wherein a magnification of the second group is about 1x.

9. The discrete zoom lens according to claim 8, wherein both the first group creates an intermediate image before the second group and the fold mirror is configured to bend an optical axis between the first group and the second group.

10. The discrete zoom lens according to claim 8, wherein a first optical element of the first changeable optical group has positive optical power and is made in a form of a positive meniscus lens whose concave surface faces toward the object, a first surface of the first optical element is formed aspherical.

11. The discrete zoom lens according to claim 8, wherein a second optical element of the first changeable optical group has a negative optical power and is made in a form of a negative meniscus lens whose concave surface faces toward the object, a second surface of the second optical element of the first changeable optical group is formed aspherical.

12. The discrete zoom lens according to claim 8, wherein a third optical element of the first changeable optical group has a positive optical power and is made in a form of a positive meniscus whose concave surface faces toward the object, a second surface of the third optical element of the first changeable optical group is formed aspherical.

13. The discrete zoom lens according to claim 8, wherein a first optical element of the second changeable optical group has a positive optical power and is made in a form of a positive meniscus lens whose concave surface faces toward the image, a first surface of the first optical element of the second changeable optical group is formed aspherical.

14. The discrete zoom lens according to claim 8, wherein a second optical element of the second changeable optical group has a negative optical power and is made in a form of a negative meniscus lens whose concave surface faces toward the image, a second surface of the second optical element of the second changeable optical group is formed aspherical.

15. The discrete zoom lens according to claim 8, wherein a third optical element of the second changeable optical group has a positive optical power and is made in a form of positive meniscus lens whose concave surface faces toward the image, a second surface of the third optical element of the second changeable optical group is formed aspherical.

16. The discrete zoom lens according to claim 8, wherein a total length of the discrete zoom lens along an optical axis does not exceed 25 inches.

17. A discrete zoom lens, with a plurality of elements arranged in order from a remote object to an image plane, comprising:
a scanning mirror;
a first group with an interchangeable first or second configuration, comprising:
if in a first configuration, a first changeable optical group having a positive optical power; and
if in a second configuration, a second changeable optical group having a positive optical power;
a fold mirror;
a second group having a positive optical power, comprising:
a first element having a positive optical power and made in a form of a double convex lens;
a second element having a positive optical power and made in a form of a positive meniscus lens whose concave surface faces toward the image;
a third element having a negative optical power and made in a form of negative meniscus lens whose concave surface faces toward the image;
a fourth element having a positive optical power and made in a form of a positive meniscus lens whose concave surface faces toward the remote object;
a fifth element having a negative optical power and made in a form of negative meniscus lens whose concave surface faces toward the remote object;
a sixth element having a positive optical power and made in a form of a positive meniscus lens whose concave surface faces toward the remote object;
a seventh element having a positive optical power and made in a form of a positive meniscus lens whose concave surface faces toward the image; and
an eighth element having a positive optical power and made in a form of a positive meniscus lens whose concave surface faces toward the remote object;
an aperture stop; and
a focal plane array.

18. The discrete zoom lens according to claim 17, wherein a total length of the discrete zoom lens along an optical axis does not exceed 25 inches.

19. The discrete zoom lens according to claim 17, wherein the elements are made of silicon or germanium.

20. The discrete zoom lens according to claim 17, wherein a cold shield is the aperture stop and is positioned between the second group and the focal plane array, a distance from the cold shield to the focal plane array is 4.37 inches.

* * * * *